(12) United States Patent
Harada et al.

(10) Patent No.: US 8,471,431 B2
(45) Date of Patent: Jun. 25, 2013

(54) BRUSHED ELECTRIC MOTOR AND METHOD FOR SETTING BRUSH CONFIGURATION

(75) Inventors: Yoshihiko Harada, Hamamatsu (JP); Yoshiaki Hayashi, Hamamatsu (JP)

(73) Assignee: ASMO Co., Ltd, Shizuoka-ken (JP)

( * ) Notice: Subject to any disclaimer, the term of this patent is extended or adjusted under 35 U.S.C. 154(b) by 139 days.

(21) Appl. No.: 13/061,042

(22) PCT Filed: Nov. 20, 2009

(86) PCT No.: PCT/JP2009/069743
§ 371 (c)(1),
(2), (4) Date: Feb. 25, 2011

(87) PCT Pub. No.: WO2010/058851
PCT Pub. Date: May 27, 2010

(65) Prior Publication Data
US 2011/0169371 A1    Jul. 14, 2011

(30) Foreign Application Priority Data
Nov. 21, 2008    (JP) .................. 2008-298514

(51) Int. Cl.
*H02K 23/20*    (2006.01)
*H02K 13/00*    (2006.01)

(52) U.S. Cl.
USPC .......................................... 310/239; 310/241

(58) Field of Classification Search
USPC ................. 310/239, 229, 233, 234, 241, 245, 310/247
IPC ................ H02K 23/20,23/30, 23/18, 13/00
See application file for complete search history.

(56) References Cited

U.S. PATENT DOCUMENTS 5,023,532 A * 6/1991 Gakenholz .................... 310/148
6,163,096 A * 12/2000 Michenfelder et al. ....... 310/239

(Continued)

FOREIGN PATENT DOCUMENTS

JP    2002-119031    4/2002
JP    2004-289992    10/2004

(Continued)

OTHER PUBLICATIONS

Machine translation of JP2008-079451A (published Apr. 2008, translated Aug. 2012).*

(Continued)

*Primary Examiner* — Tran Nguyen
*Assistant Examiner* — Michael Andrews
(74) *Attorney, Agent, or Firm* — Douglas J. Christensen

(57) ABSTRACT

A motor including a magnet, an armature, a common brush, a low-speed drive brush, and a high-speed drive brush is disclosed. The magnet forms four or more magnetic pole portions. The armature includes a rotation shaft, an armature having fourteen teeth, a coil wound around the teeth, and a commutator having fourteen segments arranged in a circumferential direction of the rotation shaft. The common brush, low-speed drive brush, and high-speed drive brush are spaced apart and arranged in the circumferential direction of the rotation shaft and each have a width in the circumferential direction of the rotation shaft. The number of teeth is the same as the number of segments. When P represents the number of magnetic pole portions of the magnet and S represents the number of teeth, (2S/P) is an odd number. The width of each brush and the location of the brush in the circumferential direction are set so that the three types of brushes, which are the common brush, the low-speed drive brush, and the high-speed drive brush, all do not simultaneously short-circuit two of the segments that are adjacent to each other in the circumferential direction.

20 Claims, 24 Drawing Sheets

U.S. PATENT DOCUMENTS

| | | | | |
|---|---|---|---|---|
| 6,922,003 | B2 * | 7/2005 | Uchida | 310/239 |
| 7,919,899 | B2 * | 4/2011 | Weigold et al. | 310/251 |
| 2007/0216255 | A1 * | 9/2007 | Weigold et al. | 310/234 |

FOREIGN PATENT DOCUMENTS

| JP | 2004289992 A * | 10/2004 |
|---|---|---|
| JP | 2007-143278 | 6/2007 |
| JP | 2008-079451 | 4/2008 |
| JP | 2008079451 A * | 4/2008 |
| JP | 2008-131780 | 6/2008 |
| JP | 2008-220046 | 9/2008 |
| WO | WO 95/32543 | 11/1995 |

OTHER PUBLICATIONS

Machine translation of JP2004-289992A (published Oct. 2004, translated Aug. 2012).*

Office Action issued for Chinese Patent Application No. 200980133816.9, dated Mar. 19, 2013 (6 pgs.).

* cited by examiner

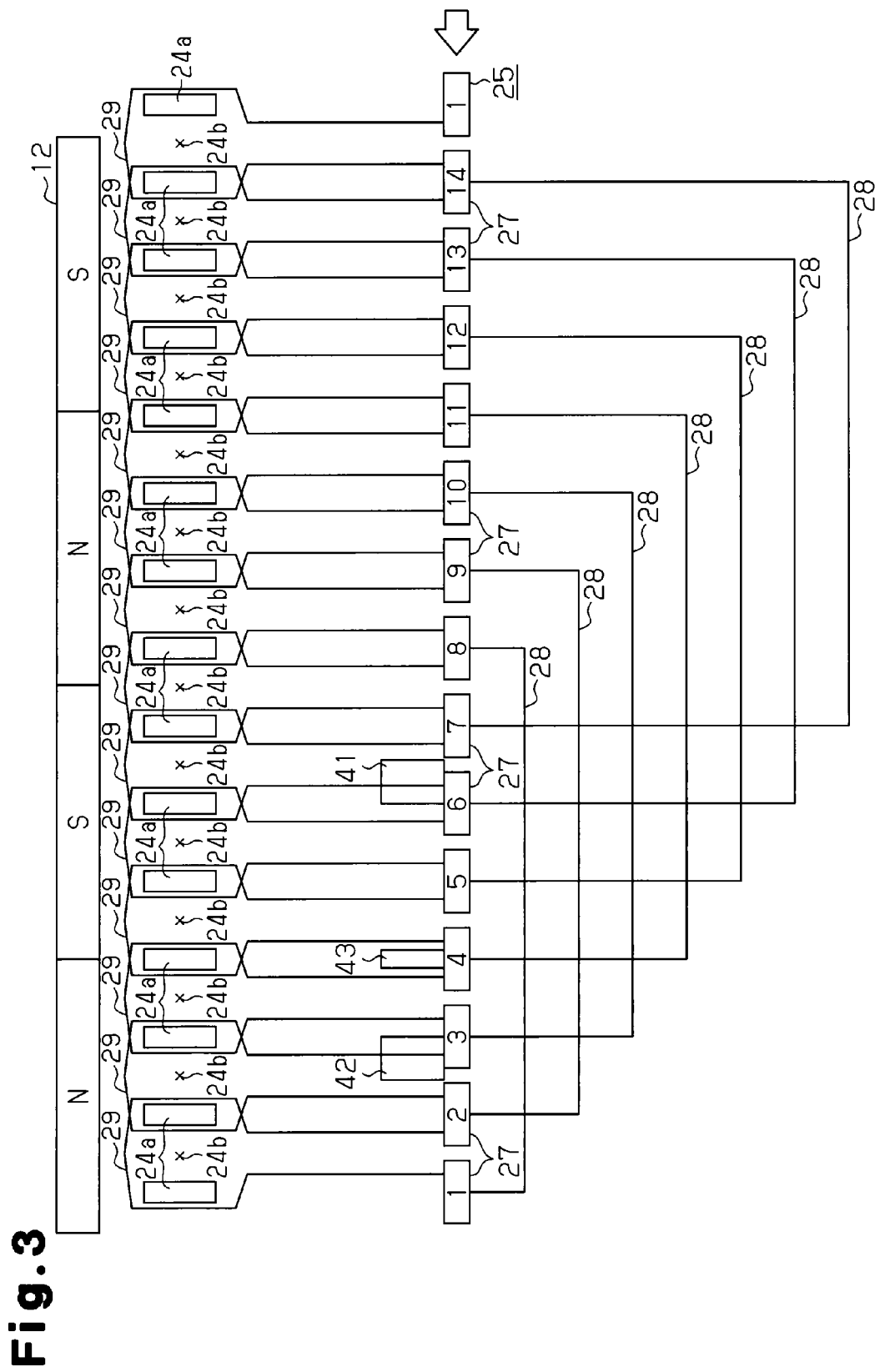

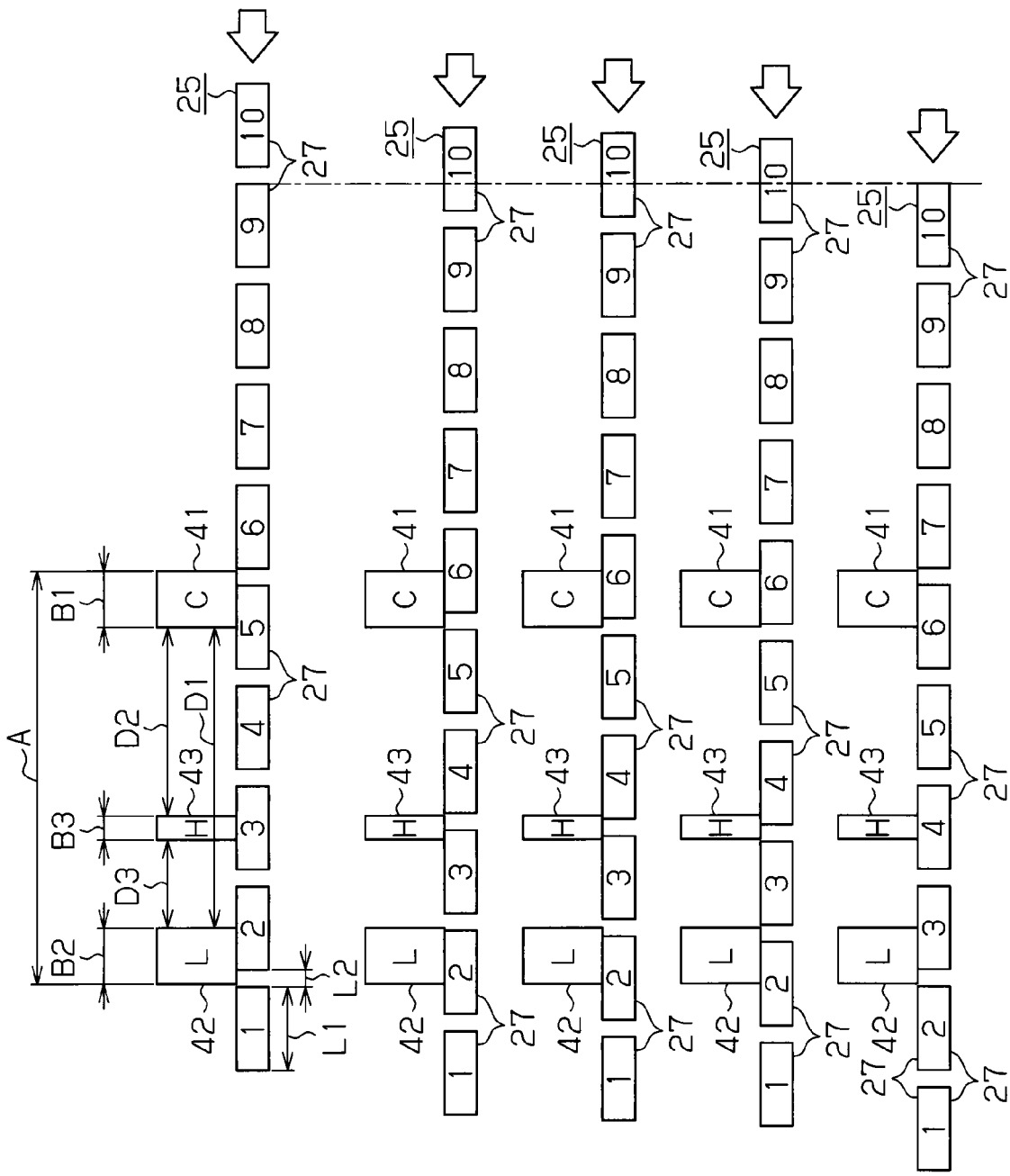

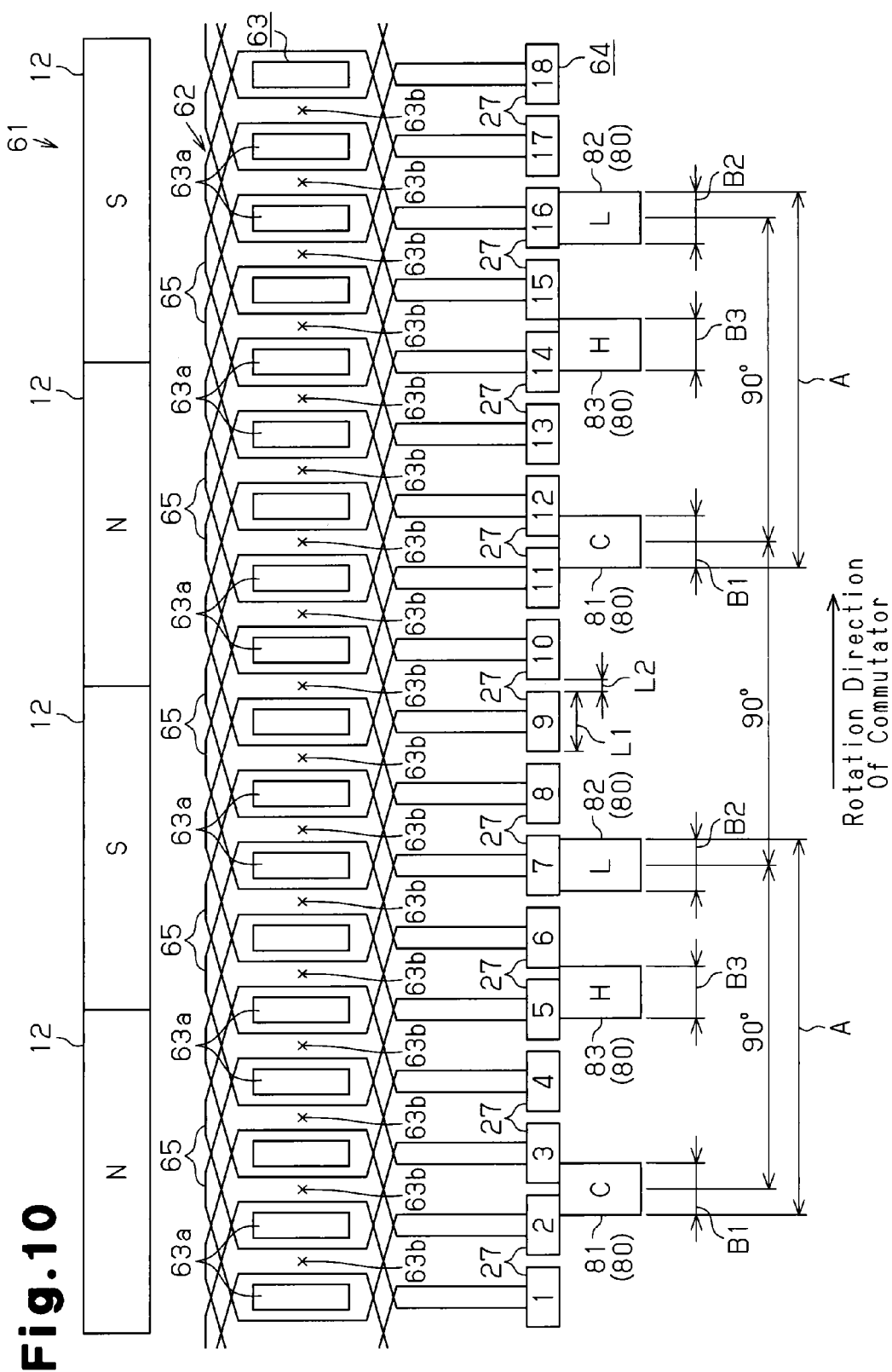

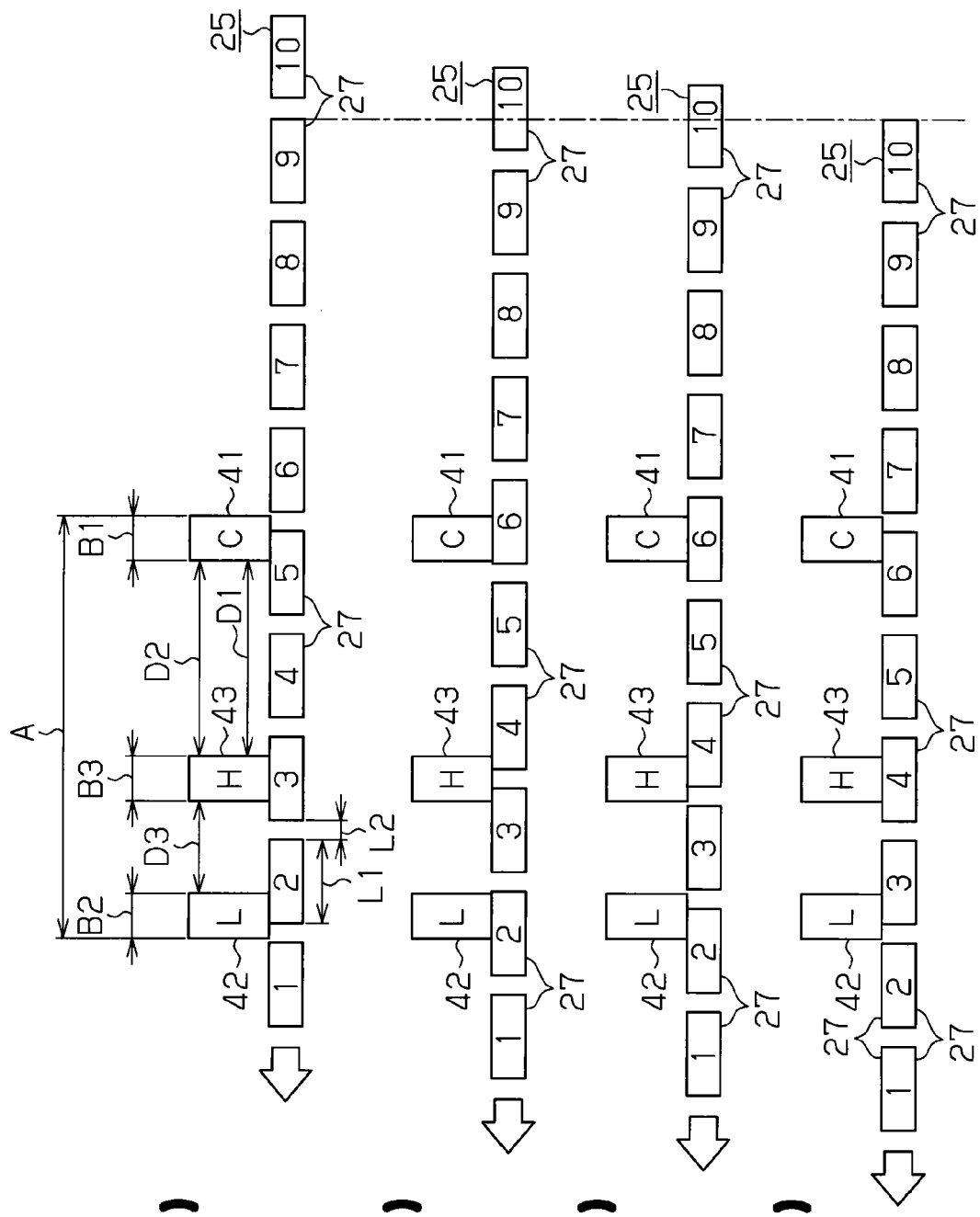

BRUSHED ELECTRIC MOTOR AND METHOD FOR SETTING BRUSH CONFIGURATION

PRIORITY CLAIM

The present application is a National Phase entry of PCT Application No. PCT/JP2009/069743, filed Nov. 20, 2009, which claims priority from Japanese Patent Application Number 2008-298514, filed Nov. 21, 2008, the disclosures of which are hereby incorporated by reference herein in their entirety.

TECHNICAL FIELD

The present invention relates to a motor including a common brush, a low-speed drive brush, and a high-speed drive brush, and a method for setting the widths and locations of the three brushes.

BACKGROUND ART

A motor that includes three brushes, which are a common brush, a low-speed drive brush, and a high-speed drive brush, and is driven at two speeds, a low-speed and a high-speed, is used to drive a vehicle wiper in the prior art. Patent literature 1 describes an example of a motor including two magnets, which are fixed to an inner circumferential surface of a yoke housing, and an armature, which is rotatably arranged at an inner side of the two magnets. The armature includes a rotation shaft, which is supported by the yoke housing, an armature core, which is fixed to the rotation shaft and has a plurality of coils wound thereon, and a commutator, which is also fixed to the rotation shaft. The commutator includes a plurality of segments arranged on the outer circumferential surface of the commutator along a circumferential direction. A common brush, a low-speed drive brush, and a high-speed drive brush are arranged near the commutator. Each brush has a distal portion slidably pressed against the outer circumferential surface of the commutator. The common brush and the low-speed drive brush are arranged at an interval of 180° in the circumferential direction of the commutator. The high-speed drive brush is arranged at a position shifted from the low-speed drive brush by a predetermined angle in the circumferential direction. The armature rotates at a low speed when supplied with current via the common brush and the low-speed drive brush and rotates at a high speed when supplied with current via the common brush and the high-speed drive brush.

Patent literature 2 also describes such a motor including three brushes. The publication describes that the motor can be miniaturized by using magnets forming four or more poles. The motor described in the publication includes four magnets, which are fixed to an inner circumferential surface of a yoke housing, and an armature, which is rotatably arranged at an inner side of the magnets. An armature core including sixteen teeth, which extend radially, and a commutator, which has sixteen segments arranged in the circumferential direction, are fixed to the rotation shaft of the armature. Sixteen coils are wound in an overlapping manner around the armature core. In each pair of segments arranged at a 180° interval, the segments are short-circuited so that they have the same potential in the commutator.

PRIOR ART LITERATURE

Patent Literature

[Patent Literature 1]
Japanese National Phase Laid-Open Patent Publication No. 10-503640

[Patent Literature 2]
Japanese Laid-Open Patent Publication No. 2007-143278

SUMMARY OF THE INVENTION

However, in the motor described in patent literature 2, the change in the number of effective coils (number of coils that generate a magnetic field when supplied with current) becomes large depending on whether or not the brushes short-circuit segments that are adjacent to each other in the circumferential direction of the rotation shaft. For example, in the motor described in patent literature 2, all sixteen coils are effective when none of the three brushes short-circuit two segments that are adjacent to each other in the circumferential direction. When the three brushes each simultaneously short-circuit two segments that are adjacent to each other in the circumferential direction, six of the coils are undergoing commutation and the remaining ten are effective coils. Therefore, in the motor described in patent literature 2, the number of effective coils is either sixteen or ten.

FIGS. 24(a) and 24(b) show another example of a motor. The motor includes a magnet, which has four magnetic pole portions, an armature core, which has fourteen teeth with fourteen coils wound thereon in an overlapping manner, and a commutator, which includes fourteen segments arranged in the circumferential direction. In each pair of segments arranged at a 180° interval, the segments are short-circuited. The three brushes of the motor are laid out in the same manner as the brushes of the motor described in patent literature 1 that includes the magnets forming two magnetic pole portions. In this motor, referring to FIG. 24(a), when a common brush 101 short-circuits two segments 111, which are adjacent to each other in the circumferential direction of the rotation shaft, two coils 112 indicated by broken lines undergo commutation, and twelve coils 112 indicated by solid lines are effective. Furthermore, referring to FIG. 24(b), when the common brush 101, a low-speed drive brush 102, and a high-speed drive brush 103 each short-circuit two segments 111, which are adjacent in the circumferential direction of the rotation shaft, six coils 112 indicated by broken lines undergo commutation, and eight coils 112 indicated by solid lines are effective. In this manner, the number of effective coils is either twelve or eight.

When the change in the number of effective coils is large, the resistance fluctuation in the coils of the armature increases. This fluctuates the value of the supplied current and thereby fluctuates the torque. The torque fluctuation vibrates the motor and generates noise.

A first object of the present invention is to suppress resistance fluctuation in the coils of a motor including magnets forming four or more magnetic pole portions, a common brush, a low-speed drive brush, and a high-speed drive brush.

A second object of the present invention is to provide a brush configuration method that suppresses resistance fluctuation in the coils of a motor including magnets forming four or more magnetic pole portions, a common brush, a low-speed drive brush, and a high-speed drive brush.

To achieve the first object, one aspect of the present invention provides a motor including at least one magnet, an armature, a common brush, a low-speed drive brush, and a high-speed drive brush. The magnet forms four or more magnetic pole portions. The armature includes a rotation shaft, an armature core fixed to the rotation shaft and having a plurality of teeth, a coil wound around the teeth, and a commutator fixed to the rotation shaft and having a plurality of segments arranged in a circumferential direction of the rotation shaft. The common brush, low-speed drive brush, and high-speed drive brush are spaced apart and arranged along the circumferential direction of the rotation shaft to slidably contact the commutator, with each brush having a width in the circumferential direction of the rotation shaft. The number of the teeth is the same as the number of segments. When the number of the magnetic pole portions formed by the magnet is represented by P and the number of the teeth is represented by S, (2S/P) is an odd number. The width and location of each brush in the circumferential direction of the rotation shaft are set so that the three types of the brushes, which are the common brush, the low-speed drive brush, and the high-speed drive brush, all do not simultaneously short-circuit two of the segments that are adjacent to each other in the circumferential direction.

In this structure, the common brush, the low-speed drive brush, and the high-speed drive brush all do not simultaneously short-circuit two of the segments that are adjacent to each other in the circumferential direction. Accordingly, changes in the number of effective coils are suppressed, and resistance fluctuation of the coil is suppressed. As a result, fluctuation in the value of the supplied current is suppressed, torque fluctuation is suppressed, and motor vibration caused by torque fluctuation is suppressed. Further, a decrease in the number of effective coils is suppressed.

Preferably, the width of each brush and the location of the brush in the circumferential direction of the rotation shaft are set so that the common brush, the low-speed drive brush, and the high-speed drive brush sequentially short-circuit two of the segments that are adjacent to each other in the circumferential direction.

In this structure, the common brush, the low-speed drive brush, and the high-speed drive brush sequentially short-circuit two segments that are adjacent to each other in the circumferential direction. Thus, sudden changes in the number of effective coils are suppressed. Accordingly, the generation of vibration in the motor is suppressed.

Preferably, rotation of the armature repeats a short-circuit state, in which a maximum of two of the three types of the brushes, which are the common brush, the low-speed drive brush, and the high-speed drive brush, short circuit two of the segments that are adjacent to each other in the circumferential direction, and a non-short-circuit state, in which none of the three types of the brushes short circuit two of the segments that are adjacent to each other in the circumferential direction.

In this structure, when in a short-circuit state, a maximum of only two types of the brushes simultaneously short circuit two segments that are adjacent to each other in the circumferential direction. Thus, by repeating the short-circuit state and a non-short-circuit state, changes in the number of effective coils may be minimized, and resistance fluctuation of the coil may be minimized. As a result, fluctuation in the value of the supplied current is minimized, and resistance fluctuation of the coil is minimized. Further, in the short-circuit state, the coils are all effective coils. Thus, the coils may be used effectively.

Preferably, rotation of the armature repeats a double type short-circuit state, in which two of the three types of the brushes, which are the common brush, the low-speed drive brush, and the high-speed drive brush, short circuit two of the segments that are adjacent to each other in the circumferential direction, a single-type short circuit state, in which one type of the brushes short circuit two of the segments that are adjacent to each other in the circumferential direction, and the non-short-circuit state so that the single-type short circuit state is performed before and after the double type short-circuit state.

In this structure, the double type short-circuit state, the single type short-circuit state, and the non-short-circuit state are repeated with the single type short-circuit state being in between the double type short-circuit states. Thus, the non-short-circuit state to the double short-circuit state or the double short-circuit state to the non-short-circuit state are reached in a stepped manner with the single type short-circuit state being in between. Accordingly, even though the double type short-circuit state is present, the number of effective coils does not suddenly change, and sudden resistance fluctuation of the coil is further suppressed. As a result, sudden fluctuations in the value of the supplied current are minimized, torque fluctuation is further suppressed, and vibration of the wiper motor caused by torque fluctuation is further suppressed.

Preferably, when the number of magnetic pole portions of the magnet is represented by P, with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, and the width of a layout area in which the three brushes are arranged is represented by A; L2<B1<(L1+2×L2), L2<B2<(L1+2×L2), L2<B3<(L1+2×L2), and A<(n×L1+(n+1)×L2) are satisfied (where the number of the segments is divided by the number P of magnetic pole portions of the magnet, and the quotient is rounded up to an integer to obtain n).

In this structure, by setting each value so as to satisfy the above conditions, a short-circuit state in which a maximum of two of the three types of brushes, which are the common brush, the low-speed drive brush, and the high-speed drive brush, short-circuit two segments that are adjacent to each other in the circumferential direction, and a non-short-circuit state, in which none of the brushes short-circuit two segments that are adjacent to each other in the circumferential direction, is easily realized.

Preferably, rotation of the armature repeats a single type short-circuit state, in which one of the three types of the brushes, which are the common brush, the low-speed drive brush, and the high-speed drive brush, short circuit two of the segments that are adjacent to each other in the circumferential direction, and the non-short-circuit state.

In this structure, two or more types of the brushes never simultaneously short-circuit two segments that are adjacent to each other in the circumferential direction. Accordingly, changes in the number of effective coils are further suppressed, and resistance fluctuation of the coil is further suppressed. As a result, fluctuation in the value of the supplied current is suppressed, torque fluctuation is suppressed, and motor vibration caused by torque fluctuation is suppressed.

Preferably, when the number of magnetic pole portions of the magnet is represented by P, with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, the width of a layout area in which the three brushes are arranged is represented by A, the common brush and the low-speed drive brush located at opposite sides of the high-speed drive brush are spaced apart by an interval represented by D1, the common brush and the high-speed drive brush are spaced apart by an interval represented by D2, and the high-speed drive brush and the low-speed drive brush are spaced apart by an interval represented by D3; B1>L2, B2>L2, B3>L2, A<(n×L1+(n+1)×L2), D1>((n−1)×L1+(n−2)×L2), D2>(n1×L1+(n1−1)×L2), D3>(n2×L1+(n2−1)×L2), n=n1+n2+1 are satisfied (where the number of the segments is divided by the number P of magnetic pole portions of the magnet, and the quotient is rounded up to an integer to obtain n, with n1 and n2 being positive integers).

In this structure, the non-short-circuit state, in which none of the three types of brushes, which are the common brush, the low-speed drive brush, and the high-speed drive brush, short-circuit two segments that are adjacent to each other in the circumferential direction, and the single type short-circuit state, in which only one type of the brushes short-circuit two segments that are adjacent to each other in the circumferential direction, is easily repeated.

Preferably, when the number of magnetic pole portions of the magnet is represented by P, with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, the width of a layout area in which the three brushes are arranged is represented by A, the common brush and the low-speed drive brush located at opposite sides of the high-speed drive brush are spaced apart by an interval represented by D1, the common brush and the high-speed drive brush are spaced apart by an interval represented by D2, and the high-speed drive brush and the low-speed drive brush are spaced apart by an interval represented by D3; B1>L2, B2>L2, B3>L2, A<(n×L1+(n+1)×L2), D1>((n−1)×L1+(n−2)×L2), D2>((n−2)×L1+(n−3)×L2), and D3>L1 are satisfied (where n is a value that is the same as the number of segments arranged in a range of (360°/P)).

In this structure, by setting each value so as to satisfy the above conditions, the common brush, the low-speed drive brush, and the high-speed drive brush alternately and singly short-circuit two segments that are adjacent to each other in the circumferential direction.

Preferably, the common brush, the low-speed drive brush, and the high-speed drive brush are arranged in the order of the common brush, the high-speed drive brush, and the low-speed drive brush from a rear side to a front side in a rotation direction of the commutator.

In this structure, the brushes are arranged in the order of the common brush, the high-speed drive brush, and the low-speed drive brush from the rear side to the front side with respect to the rotation direction of the commutator. When the wiper motor is driven, the induced voltage generated by the rotation of the armature shifts the magnetic center of the armature (the center in the circumferential direction of the pole formed when the coil is supplied with current) slightly toward the rear in the rotation direction of the commutator. Thus, when the brushes are arranged in the order of the common brush, the high-speed drive brush, and the low-speed drive brush from the rear side to the front side in the rotation direction of the commutator, the magnetic center formed in the armature when supplying current with the high-speed drive brush is located near the magnetic center formed in the armature when supplying power with the low-speed drive brush. As a result, the motor may be used more effectively without adversely affecting the performance of the wiper motor when the wiper motor is driven at a low speed and when driven at a high speed.

Preferably, a slot, through which the coil extends, is formed between adjacent ones of the teeth in the circumferential direction of the rotation shaft, and a value obtained by dividing the total number of slots by two is an odd number.

In this structure, the short-circuiting of two segments that are adjacent to each other in the circumferential direction with the low-speed drive brush and the high-speed drive brush becomes further easier.

To achieve the second object, a further embodiment of the present invention provides a brush configuration method for setting a width and a location for a plurality of brushes in a motor. The motor includes at least one magnet, which forms four or more magnetic pole portions, and an armature. The armature includes a rotation shaft, an armature core, a coil, and a commutator. The armature core is fixed to the rotation shaft and has a plurality of teeth. The coil is wound around the teeth. The commutator is fixed to the rotation shaft and has a plurality of segments arranged in a circumferential direction of the rotation shaft. A common brush, a low-speed drive brush, and a high-speed drive brush are spaced apart and arranged along the circumferential direction of the rotation shaft in slidably contact with the commutator. Each brush has a width in the circumferential direction of the rotation shaft. The method includes setting the number of the teeth to be the same as the number of the segments, setting the number of the magnetic pole portions formed by the magnet and represented by P and the number of the teeth represented by S so that (2S/P) is an odd number, and setting the width of each brush and location of the brush in the circumferential direction of the rotation shaft so that the three types of the brushes, which are the common brush, the low-speed drive brush, and the high-speed drive brush, all do not simultaneously short-circuit two of the segments that are adjacent to each other in the circumferential direction.

In this method, the common brush, the low-speed drive brush, and the high-speed drive brush all do not simultaneously short-circuit two of the segments that are adjacent to each other in the circumferential direction. Accordingly, changes in the number of effective coils are suppressed, and resistance fluctuation of the coil is suppressed. As a result, fluctuation in the value of the supplied current is suppressed, torque fluctuation is suppressed, and motor vibration caused by torque fluctuation is suppressed. Further, a decrease in the number of effective coils is suppressed.

Preferably, the width of each brush and location of the brush in the circumferential direction of the rotation shaft are set so that the common brush, the low-speed drive brush, and the high-speed drive brush sequentially short-circuit two of the segments that are adjacent to each other in the circumferential direction.

In this method, the common brush, the low-speed drive brush, and the high-speed drive brush sequentially short-circuit two segments that are adjacent to each other in the circumferential direction. Thus, sudden changes in the number of effective coils are suppressed. Accordingly, the generation of vibration in the motor is suppressed.

Preferably, the width of each brush and location of the brush in the circumferential direction of the rotation shaft are set so that rotation of the armature repeats a short-circuit state, in which a maximum of two of the three types of the brushes, which are the common brush, the low-speed drive brush, and the high-speed drive brush, short circuit two of the segments that are adjacent to each other in the circumferential direction, and a non-short-circuit state in which none of the three types of the brushes short circuit two of the segments that are adjacent to each other in the circumferential direction.

In this method, when in a short-circuit state, a maximum of only two types of the brushes simultaneously short circuit two segments that are adjacent to each other in the circumferential direction. Thus, by repeating the short-circuit state and a non-short-circuit state, changes in the number of effective coils may be minimized, and resistance fluctuation of the coil may be minimized. As a result, fluctuation in the value of the supplied current is minimized, and resistance fluctuation of the coil is minimized. Further, in the short-circuit state, the coils are all effective coils. Thus, the coils may be used effectively.

Preferably, the width of each brush and location of the brush in the circumferential direction of the rotation shaft are set so that rotation of the armature repeats a double type short-circuit state, in which two of the three types of the brushes, which are the common brush, the low-speed drive brush, and the high-speed drive brush, short circuit two of the segments that are adjacent to each other in the circumferential direction, a single-type short circuit state, in which one type of the brushes short circuit two of the segments that are adjacent to each other in the circumferential direction, and the non-short-circuit state so that the single-type short circuit state is performed before and after the double type short-circuit state.

In this method, the double type short-circuit state, the single type short-circuit state, and the non-short-circuit state are repeated with the single type short-circuit state being in between the double type short-circuit states. Thus, the non-short-circuit state to the double short-circuit state or the double short-circuit state to the non-short-circuit state are reached in a stepped manner with the single type short-circuit state being in between. Accordingly, even though the double type short-circuit state is present, the number of effective coils does not suddenly change, and sudden resistance fluctuation of the coil is further suppressed. As a result, sudden fluctuations in the value of the supplied current are minimized, torque fluctuation is further suppressed, and vibration of the wiper motor caused by torque fluctuation is further suppressed.

Preferably, when the number of magnetic pole portions of the magnet is represented by P, with respect to the circumferential direction of the rotation shaft, when the segments each have a width represented by $L1$, adjacent ones of the segments are spaced apart by an interval represented by $L2$, the width of the common brush is represented by $B1$, the width of the low-speed drive brush is represented by $B2$, the width of the high-speed drive brush is represented by $B3$, and the width of a layout area in which the three brushes are arranged is represented by $A$, each value is set to satisfy $L2<B1<(L1+2\times L2)$, $L2<B2<(L1+2\times L2)$, $L2<B3<(L1+2\times L2)$, and $A<(n\times L1+(n+1)\times L2)$ (where the number of the segments is divided by the number P of magnetic pole portions of the magnet, and the quotient is rounded up to an integer to obtain n).

In this method, by setting each value so as to satisfy the above conditions, a structure that repeats the non-short-circuit state, in which none of the three types of brushes, the common brush, the low-speed drive brush, and the high-speed drive brush, short-circuit two segments that are adjacent to each other in the circumferential direction, and the single type short-circuit state, in which only one type of the brushes short-circuit two segments that are adjacent to each other in the circumferential direction, is easily realized.

Preferably, the width of each brush and location of the brush in the circumferential direction of the rotation shaft are set so that rotation of the armature repeats a single type short-circuit state, in which one of the three types of the brushes, which are the common brush, the low-speed drive brush, and the high-speed drive brush, short circuit two of the segments that are adjacent to each other in the circumferential direction, and the non-short-circuit state.

In this method, two or more types of the brushes never simultaneously short-circuit two segments that are adjacent to each other in the circumferential direction. Accordingly, changes in the number of effective coils are further suppressed, and resistance fluctuation of the coil is further suppressed. As a result, fluctuation in the value of the supplied current is suppressed, torque fluctuation is suppressed, and motor vibration caused by torque fluctuation is suppressed.

Preferably, when the number of magnetic pole portions of the magnet is represented by P, with respect to the circumferential direction of the rotation shaft, when the segments each have a width represented by $L1$, adjacent ones of the segments are spaced apart by an interval represented by $L2$, the width of the common brush is represented by $B1$, the width of the low-speed drive brush is represented by $B2$, the width of the high-speed drive brush is represented by $B3$, the width of a layout area in which the three brushes are arranged is represented by $A$, the common brush and the low-speed drive brush located at opposite sides of the high-speed drive brush are spaced apart by an interval represented by $D1$, the common brush and the high-speed drive brush are spaced apart by an interval represented by $D2$, and the high-speed drive brush and the low-speed drive brush are spaced apart by an interval represented by $D3$, each value is set to satisfy $B1>L2$, $B2>L2$, $B3>L2$, $A<(n\times L1+(n+1)\times L2)$, $D1>((n-1)\times L1+(n-2)\times L2)$, $D2>(n1\times L1+(n1-1)\times L2)$, $D3>(n2\times L1+(n2-1)\times L2)$, $n=n1+n2+1$ (where the number of the segments is divided by the number P of magnetic pole portions of the magnet, and the quotient is rounded up to an integer to obtain n, with n1 and n2 being positive integers).

In this method, the non-short-circuit state, in which none of the three types of brushes, which are the common brush, the low-speed drive brush, and the high-speed drive brush, short-circuit two segments that are adjacent to each other in the circumferential direction, and the single type short-circuit state, in which only one type of the brushes short-circuit two segments that are adjacent to each other in the circumferential direction, is easily repeated.

Preferably, when the number of magnetic pole portions of the magnet is represented by P, with respect to the circumferential direction of the rotation shaft, when the segments each have a width represented by $L1$, adjacent ones of the segments are spaced apart by an interval represented by $L2$, the width of the common brush is represented by $B1$, the width of the low-speed drive brush is represented by $B2$, the width of the high-speed drive brush is represented by $B3$, the width of a layout area in which the three brushes are arranged is represented by $A$, the common brush and the low-speed drive brush located at opposite sides of the high-speed drive brush are spaced apart by an interval represented by $D1$, the common brush and the high-speed drive brush are spaced apart by an interval represented by $D2$, and the high-speed drive brush and the low-speed drive brush are spaced apart by an interval represented by $D3$, each value is set to satisfy $B1>L2$, $B2>L2$, $B3>L2$, $A<(n\times L1+(n+1)\times L2)$, $D1>((n-1)\times L1+(n-2)\times L2)$, $D2>((n-2)\times L1+(n-3)\times L2)$, and $D3>L1$ (where n is a value that is the same as the number of segments arranged in a range of $(360°/P)$).

In this method, by setting each value so as to satisfy the above conditions, the common brush, the low-speed drive brush, and the high-speed drive brush alternately and singly short-circuit two segments that are adjacent to each other in the circumferential direction.

Preferably, the common brush, the low-speed drive brush, and the high-speed drive brush are arranged in the order of the common brush, the high-speed drive brush, and the low-speed drive brush from a rear side to a front side in a rotation direction of the commutator.

In this method, the brushes are arranged in the order of the common brush, the high-speed drive brush, and the low-speed drive brush from the rear side to the front side with respect to the rotation direction of the commutator. When the wiper motor is driven, the induced voltage generated by the rotation of the armature shifts the magnetic center of the armature (the center in the circumferential direction of the pole formed when the coil is supplied with current) slightly toward the rear in the rotation direction of the commutator. Thus, when the brushes are arranged in the order of the common brush, the high-speed drive brush, and the low-speed drive brush from the rear side to the front side in the rotation direction of the commutator, the magnetic center formed in the armature when supplying current with the high-speed drive brush is located near the magnetic center formed in the armature when supplying power with the low-speed drive brush. As a result, the motor may be used more effectively without adversely affecting the performance of the wiper motor when the wiper motor is driven at a low speed and when driven at a high speed.

Preferably, a slot, through which the coil extends, is formed between adjacent ones of the teeth in the circumferential direction of the rotation shaft, and the number of the teeth is set such that a value obtained by dividing the total number of slots by two is an odd number.

In this method, the short-circuiting of two segments that are adjacent to each other in the circumferential direction with the low-speed drive brush and the high-speed drive brush becomes further easier.

BRIEF DESCRIPTION OF THE DRAWINGS

FIG. 3 is a schematic diagram in which a motor unit of the first embodiment is laid out along a plane;

FIGS. 4(a) to 4(e) are diagrams showing the positional relationship of a commutator and three brushes in the first embodiment;

FIG. 10 is a schematic diagram in which a motor unit of the third embodiment is laid out along a plane;

FIGS. 15(a) to 15(d) are diagrams showing the width and location of the brushes in the circumferential direction in a further example;

DETAILED DESCRIPTION OF THE PREFERRED EMBODIMENTS

First Embodiment

A wiper motor according to a first embodiment of the present invention will now be discussed with reference to the drawings.

Figure 1:
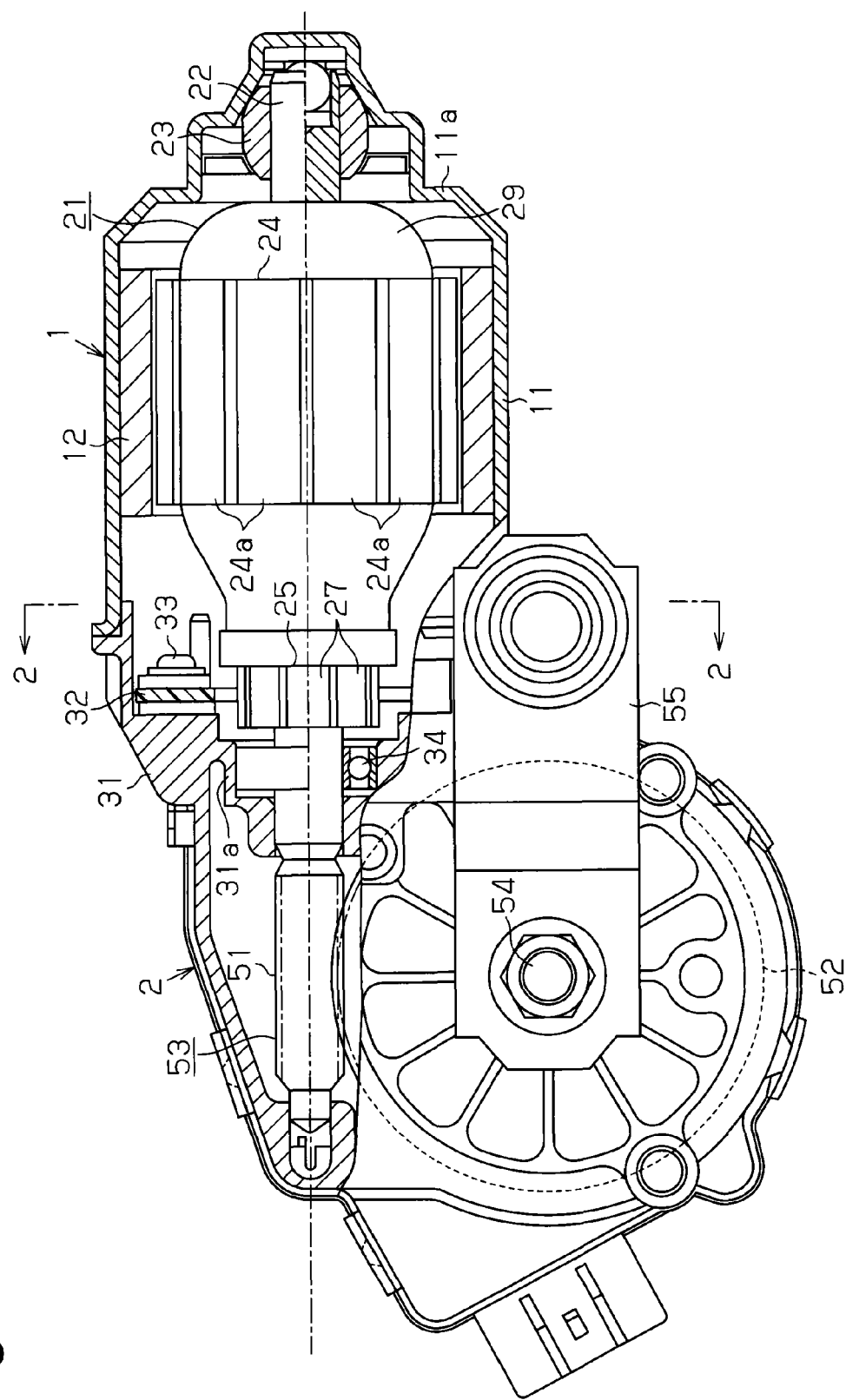
FIG. 1 is a schematic diagram showing a wiper motor according to first to third embodiments of the present invention.

FIG. 1 is a schematic diagram showing a wiper motor of the present embodiment. The wiper motor is used as a drive source for a vehicle wiper (not shown), which wipes the windshield or the like of a vehicle, and includes a motor unit 1 and a reduction gear 2 coupled to the motor unit 1.

The motor unit 1 includes a tubular yoke housing 11 having a bottom 11a. At least one magnet 12 forming four magnetic pole portions (two N poles and two S poles) is fixed to an inner circumferential surface of the yoke housing 11. Thus, the motor unit 1 includes two magnetic circuits. The N poles and the S poles of the magnet 12 are alternately arranged in the circumferential direction of the yoke housing 11.

An armature 21 is rotatably arranged at a radially inner side of the magnet 12. The armature 21 includes a rotation shaft 22, an armature core 24, and a commutator 25. The rotation shaft 22 has a basal end located near the bottom 11a of the yoke housing 11 and supported by a bearing 23, which is arranged at a central part of the bottom 11a. Further, the rotation shaft 22 has a distal end extending from an opening of the yoke housing 11 towards the reduction gear 2.

The armature core 24 is arranged facing the magnet 12 in the radial direction and is fixed to the rotation shaft 22 so as to be integrally rotatable with the rotation shaft 22. The armature core 24 includes fourteen teeth 24a, which extend radially outward about the rotation shaft 22. A slot 24b is formed between the teeth 24a that are adjacent to each other in the circumferential direction of the armature core 24 (see FIG. 3).

Figure 2:
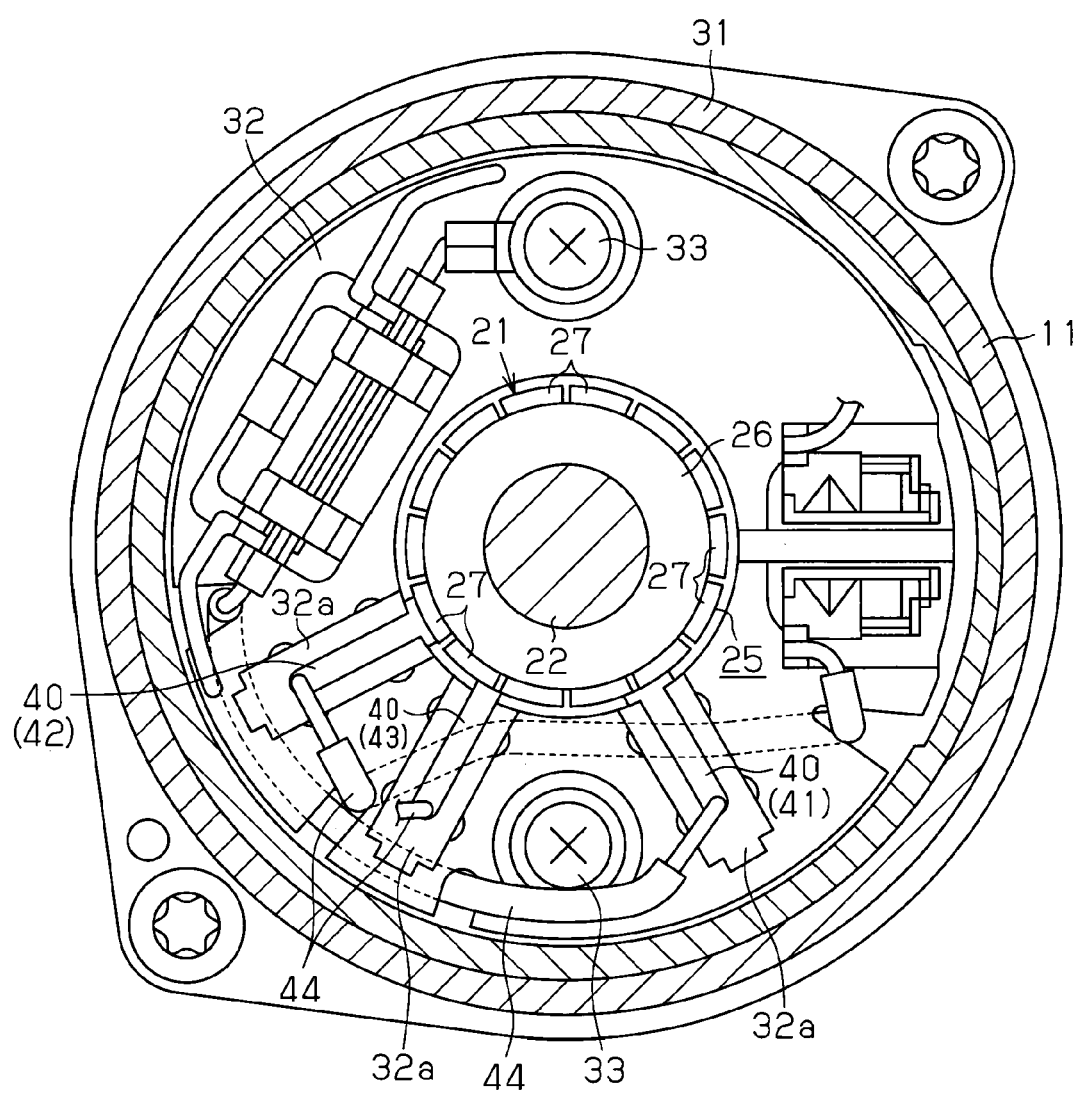
FIG. 2 is a cross-sectional view of the wiper motor taken along line 2-2 in FIG. 1.

The commutator 25 is fixed to the rotation shaft 22 so as to be integrally rotatable with the rotation shaft 22 at a portion closer to the reduction gear 2 than the armature core 24. As shown in FIG. 2, the commutator 25 includes a cylindrical insulator 26, which is formed from an insulative resin material and externally fitted to the rotation shaft 22, and fourteen segments 27 fixed to the outer circumferential surface of the insulator 26. Each segment 27 is formed by a rectangular plate elongated in the axial direction of the rotation shaft 22 (see FIG. 1) and curved along the outer circumferential surface of the insulator 26. The fourteen segments 27 are arranged so as to form a cylindrical shape in overall. Adjacent ones of the segments 27 are spaced apart from each other in the circumferential direction of the rotation shaft 22. The segments 27 that are spaced apart from each other by an interval of 180° are paired so that every first segment 27 is paired with the eighth segment 27 in the present embodiment. Thus, there are seven pairs of the segments 27. A short-circuit line 28, such as a conductive wire, short-circuits the segments 27 of each pair (refer to FIG. 3). In FIG. 3, the fourteen segments 27 are numbered in order from "1" to "14" along the circumferential direction.

Fourteen coils 29 are wound in an overlapping manner about the teeth 24a. Each coil 29 extends through the slot 24b and across two teeth 24a. Each coil 29 has an initial winding end connected to one of the segments 27 and a terminal winding end connected to another one of the segments 27, which is the adjacent one in the circumferential direction of the rotation shaft 22. The fourteen coils 29 are thus connected in series to form a single loop as a whole. When short-circuiting the segments 27 of each pair arranged at 180° intervals, two closed loops are formed. Each loop includes seven coils 29 (refer to FIG. 6(a)).

As shown in FIG. 1, the reduction gear 2 includes a gear housing 31, which is fixed to the open end of the yoke housing 11. The gear housing 31 has an opening facing toward the yoke housing 11. A brush holder 32 is fastened by a screw 33 to the gear housing 31 in the opening and arranged at the outer side of the commutator 25. The brush holder 32 is annular and formed from an insulative resin material.

As shown in FIG. 2, three holding portions 32a are defined on the surface of the brush holder 32 facing toward the motor unit 1. Each holding portion 32a has the form of a tetragonal tube that extends in the radial direction. A power supply brush 40 having the form of a tetragonal rod is inserted into each holding portion 32a. Each power supply brush 40 is urged towards the commutator 25 by a spring or the like (not shown), which is accommodated in the holding portion 32a, and has a distal portion slidably pressed against the outer circumferential surface of the commutator 25 (i.e., surface at radially outward side of each segment 27). The power supply brush 40 located at the right as viewed in FIG. 2 functions as a common brush 41. The power supply brush 40 located at the left as viewed in FIG. 2 functions as a low-speed drive brush 42, which supplies current to the armature 21 with the common brush 41 to rotate the armature 21 at a low speed. The power supply brush 40 located in the middle as viewed in FIG. 2 functions as a high-speed drive brush 43, which supplies current to the armature 21 with the common brush 41 to rotate the armature 21 at a high speed. The three brushes 41, 42, and 43 are arranged in the order of the common brush 41, the high-speed drive brush 43, and the low-speed drive brush 42 from the rear side to the front side with respect to the rotation direction of the commutator 25. That is, the high-speed drive brush 43 is arranged at the front side of the common brush 41 in the rotation direction commutator 25, and the low-speed drive brush 42 is arranged at the front side of the high-speed drive brush 43 in the rotation direction of the commutator 25. The common brush 41 functions as a cathode brush, and the low-speed drive brush 42 and high-speed drive brush 43 function as anode brushes. Each power supply brush 40 is connected to a pigtail 44. The pigtails 44 supply current to the power supply brushes 40.

Further, as shown in FIG. 1, a cylindrical bearing seat 31a extending along the axial direction of the rotation shaft 22 is arranged in the opening of the gear housing 31. An annular bearing 34, which is received in the bearing seat 31a, axially supports the middle part of the rotation shaft 22. The bearing 34 cooperates with the bearing 23 to axially support the rotation shaft 22. The rotation shaft 22 extends through the bearing 34 into the gear housing 31. A spirally threaded worm 51 is formed on the portion of the rotation shaft 22 located in the gear housing 31. A disk-shaped worm wheel 52 engaged with the worm 51 is accommodated in the gear housing 31. The worm 51 and the worm wheel 52 form a reduction gear mechanism 53 for reducing the rotation speed of the rotation shaft 22.

A cylindrical output shaft 54, which extends in the axial direction of the worm wheel 52 and rotates integrally with the worm wheel 52, is arranged at the central part of the worm wheel 52. The output shaft 54 has a distal portion projecting out of the gear housing 31 and fixed to a basal portion of a crank arm 55. The crank arm 55 has a distal portion coupled by a link mechanism (not shown) to the vehicle wiper (not shown).

In the wiper motor, when current is supplied to the armature 21 via the common brush 41 and the low-speed drive brush 42, the armature 21 rotates at a low speed. Further, when current is supplied to the armature 21 via the common brush 41 and the high-speed drive brush 43, the armature 21 rotates at a high speed. When the armature 21 rotates, the rotation of the rotation shaft 22 is decelerated by the worm 51 and the worm wheel 52 and output from the output shaft 54. This pivots the vehicle wiper, which is coupled to the crank arm 55 by the link mechanism, in a reciprocating manner.

The widths and locations of the three power supply brushes 40 (i.e., common brush 41, low-speed drive brush 42, and high-speed drive brush 43) in the circumferential direction of the rotation shaft 22 will now be discussed. Referring to FIG. 4(a), in the wiper motor of the present embodiment, the width and location of each of the brushes 41 to 43 in the circumferential direction are set so that the common brush 41, the low-speed drive brush 42, and the high-speed drive brush 43 alternately and singly short-circuit the two segments 27, which are adjacent to each other in the circumferential direction, at different timings.

First, the number P of magnetic pole portions formed by the magnet 12 is set to a value satisfying the expression of $P \geq 4$. The number of teeth 24a and the number of segments 27 are set to be the same in the wiper motor. If the number of teeth 24a (i.e., number of segments 27) is S, the value of S is set such that (2S/P) is an odd number. In the present embodiment, the expressions of P=4 and S=14 are satisfied. Thus, the expression (2S/P) results in a value of "7", which is an odd number.

With respect to the circumferential direction of the rotation shaft 22, the width of the segment 27 is represented by L1, the interval between adjacent ones of segments 27 is represented by L2, the width of the common brush 41 is represented by B1, the width of the low-speed drive brush 42 is represented by B2, the width of the high-speed drive brush 43 is represented by B3, the width of the layout area of the three brushes 41 to 43 in which the high-speed drive brush 43 is located at the middle is represented by A, the interval between the common brush 41 and the low-speed drive brush 42 located at opposite sides of the high-speed drive brush 43 is represented by D1, the interval between the common brush 41 and the high-speed drive brush 43 is represented by D2, and the interval between the high-speed drive brush 43 and the low-speed drive brush 42 is represented by D3. In this case, these values are each set to satisfy the conditions shown below.

$$B1>L2, B2>L2, B3>L2,$$

$$A<(n \times L1+(n+1) \times L2),$$

$$D1>((n-1) \times L1+(n-2) \times L2), D2>((n-2) \times L1+(n-3) \times L2),$$

$$D3>L1$$

Here, "n" is a value that is the same as the number of segments 27 arranged in an angular range of (360°/P). In the present embodiment, P is 4 and the number of segments 27 is "14". Thus, n is a value satisfying $(360°/14) \times (n-1) \leqq 360°/4 \leqq (360°/14) \times n$, where n=4.

In a setting that satisfies the above conditions, the high-speed drive brush 43 of the present embodiment has a width in the circumferential direction of the rotation shaft 22 that is smaller than that of the common brush 41 and the low-speed drive brush 42.

The relationship of the commutator 25 and the brushes 41 to 43 when the commutator 25 is rotated in the wiper motor of the present embodiment, which has the common brush 41, the low-speed drive brush 42, and the high-speed drive brush 43 arranged near the commutator 25 so as to satisfy the above conditions, will now be discussed with reference to FIGS. 4 and 5. In FIGS. 4 and 5, the rotation direction of the commutator 25 is indicated by an arrow.

Figure 5A:
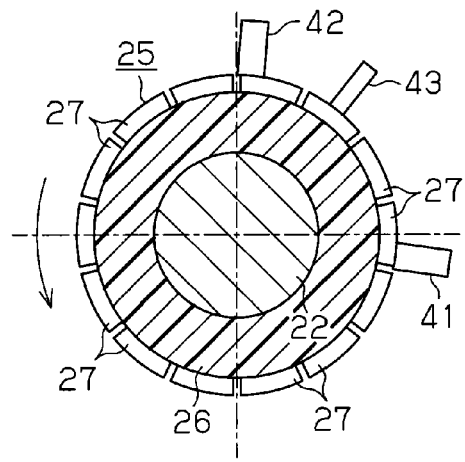
FIGS. 5(a) to 5(d) are diagrams showing the positional relationship of the commutator and the three brushes in the first embodiment.

In FIGS. 4(a) and 5(a), the common brush 41 starts to short-circuit the number "5" and "6" segments 27, which are adjacent to each other in the circumferential direction. In this state, the low-speed drive brush 42 has one circumferential end (front end in the rotation direction of the commutator 25) arranged between the number "1" and "2" segments 27, which are adjacent to each other in the circumferential direction. Thus, the low-speed drive brush 42 contacts only the number "2" segment 27 and does not contact the number "1" segment 27. Further, the high-speed drive brush 43 contacts only the number "4" segment 27 and has two circumferential ends that are both arranged inward from the two circumferential ends of the number "4" segment 27. When the common brush 41 is short-circuiting two circumferentially adjacent segments 27, the low-speed drive brush 42 and the high-speed drive brush 43 each contact only one segment 27 and do not short-circuit two circumferentially adjacent segments 27.

Figure 5B:
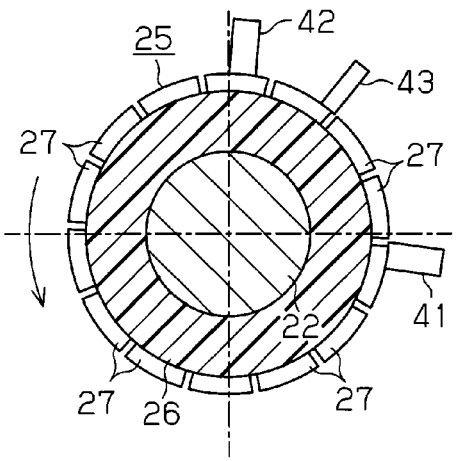

When shifting from the state shown in FIGS. 4(a) and 5(a) to the state shown in FIGS. 4(b) and 5(b), the high-speed drive brush 43 starts to short-circuit the number "3" and "4" segments 27, which are adjacent to each other in the circumferential direction. In this state, the common brush 41 ends the short-circuiting of two adjacent segments 27 and has one circumferential end (front end in the rotation direction of the commutator 25) arranged between the number "5" and "6" segments 27. The common brush 41 contacts only the number "6" segment 27 and does not contact the number "5" segment 27. Further, the low-speed drive brush 42 has one circumferential end (rear end in the rotation direction of the commutator 25) arranged between the number "2" and "3" segments 27, which are adjacent to each other in the circumferential direction. The low-speed drive brush 42 contacts only the number "2" segment 27 and does not contact the number "3" segment 27. As shown in FIG. 4C, when the high-speed drive brush 43 is short-circuiting two circumferentially adjacent segments 27, the common brush 41 and the low-speed drive brush 42 each contact only one segment 27 and do not short-circuit two circumferentially adjacent segments 27.

Figure 5C:
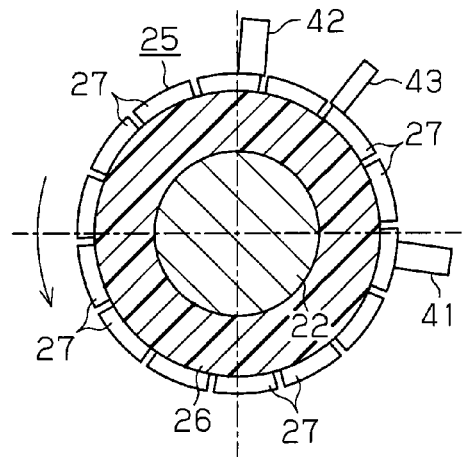

Then, when shifting to the state shown in FIGS. 4(d) and 5(c), the low-speed drive brush 42 starts to short-circuit the number "2" and "3" segments 27, which are adjacent to each other in the circumferential direction. In this state, the high-speed drive brush 43 ends the short-circuiting of two adjacent segments 27 and has one circumferential end (front end in the rotation direction of the commutator 25) arranged between the number "3" and "4" segments 27. The high-speed drive brush 43 contacts only the number "4" segment 27 and does not contact the number "3" segment 27. The common brush 41 has one circumferential end (front end in the rotation direction of the commutator 25) arranged between the number "5" and "6" segments 27. The common brush 42 contacts only the number "6" segment 27 and does not contact the number "5" segment 27. When the low-speed drive brush 42 is short-circuiting two circumferentially adjacent segments 27, the high-speed drive brush 43 and the low-speed drive brush 42 each contact only one segment 27 and do not short-circuit two circumferentially adjacent segments 27.

Figure 5D:
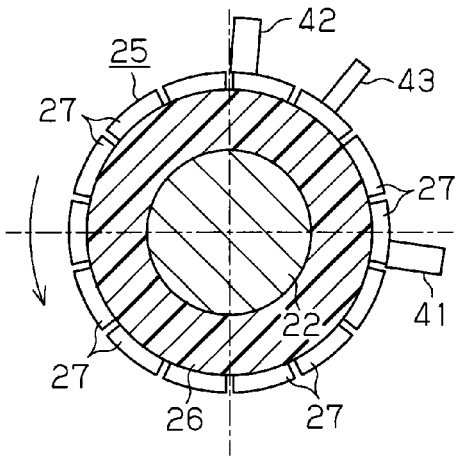

When the commutator 25 is further rotated to the state shown in FIGS. 4(e) and 5(d), the low-speed drive brush 42 ends the short-circuiting of the two circumferentially adjacent segments 27, and the common brush 41 starts to short-circuit two circumferentially adjacent segments 27 adjacent in the circumferential direction in the same manner as the state shown in FIGS. 4(a) and 5(a). Subsequently, as the commutator 25 rotates, states similar to the state shown in FIGS. 4(a) to 4(e) and FIGS. 5(a) to 5(d) are repeated. In other words, in the order of the common brush 41, the high-speed drive brush 43, and the low-speed drive brush 42, the brushes 41 to 43 alternately and singly short-circuit circumferentially adjacent segments 27. Thus, when one of the three brushes 41 to 43 is short-circuiting two circumferentially adjacent segments 27, the remaining two contact only one segment 27.

Figure 6A:
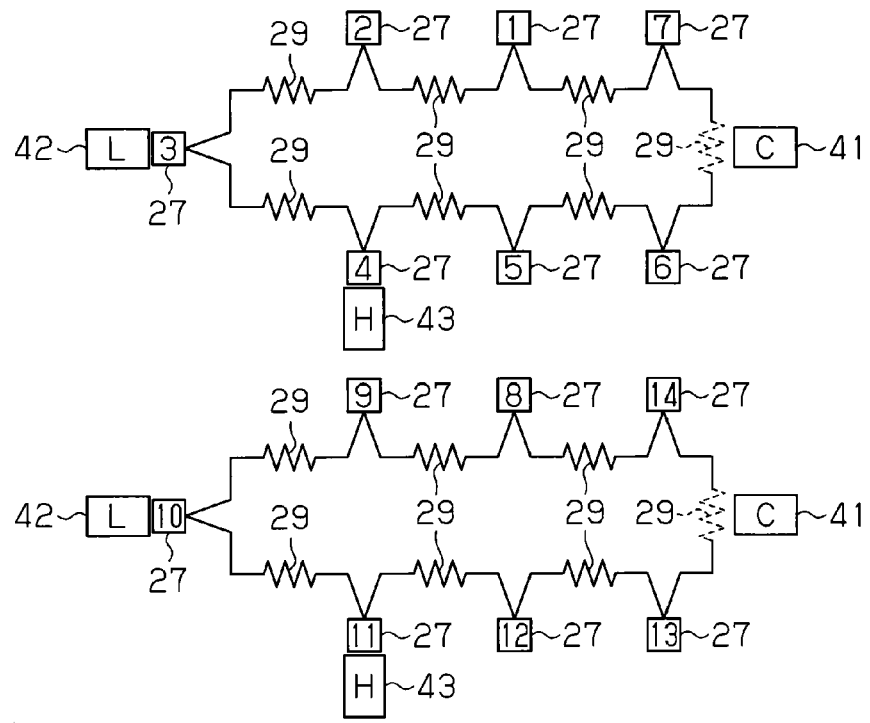
FIGS. 6(a) and 6(b) are diagrams showing changes in the number of effective coils in the wiper motor according to the first embodiment.
Figure 6B:
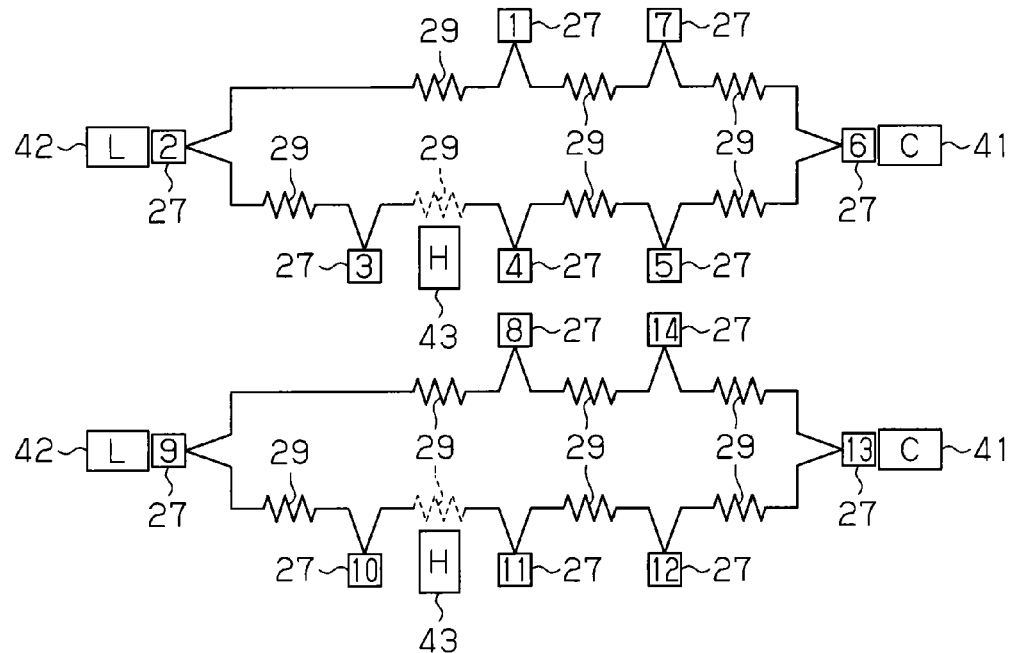

As shown in FIG. 6(a), when the common brush 41 of the three brushes 41 to 43 is short-circuiting two circumferentially adjacent segments 27, among the fourteen coils 29, two are short-circuited as indicated by the broken lines, and the remaining twelve are effective coils. In the same manner, as shown in FIG. 6(b), when the high-speed drive brush 43 is short-circuiting two circumferentially adjacent segments 27, among the fourteen coils 29, two are short-circuited as indicated by the broken lines, and the remaining twelve are effective coils. Further, when the low-speed drive brush 42 is short-circuiting two circumferentially adjacent segments 27, two are short-circuited, and the remaining twelve are effective coils. Thus, the number of effective coils does not change. This minimizes resistance fluctuation of the coils 29.

The first embodiment has the advantages described below.

(1) The common brush 41, the low-speed drive brush 42, and the high-speed drive brush 43 do not short-circuit two circumferentially adjacent segments 27 at the same time. More specifically, the common brush 41, the low-speed drive brush 42, and the high-speed drive brush 43 alternately and singly short-circuit two circumferentially adjacent segments 27. Further, two or more brushes do not short-circuit two circumferentially adjacent segments 27 at the same time. Thus, the number of effective coils does not change, and the resistance fluctuation of the coils 29 is minimized. As a result, fluctuation in the value of the supplied current is minimized, and torque fluctuation is minimized. This prevents the wiper motor from vibrating and thereby keeps the generated noise subtle.

(2) The widths and locations of the common brush 41, the low-speed drive brush 42, and the high-speed drive brush 43 in the circumferential direction are set based on the conditions of B1>L2, B2>L2, B3>L2, A<(n×L1+(n+1)×L2), D1>((n−1)×L1+(n−2)×L2), D2>((n−2)×L1+(n−3)×L2), D3>L1. By setting each value so as to satisfy the above conditions, a structure in which the common brush 41, the low-speed drive brush 42, and the high-speed drive brush 43 alternately and singly short-circuit two circumferentially adjacent segments 27 is easily realized.

(3) The common brush 41, the low-speed drive brush 42, and the high-speed drive brush 43 are arranged in the order of the common brush 41, the high-speed drive brush 43, and the low-speed drive brush 42 from the rear side to the front side with respect to the rotation direction of the commutator 25. When the wiper motor is driven, the induced voltage generated by the rotation of the armature 21 shifts the magnetic center of the armature 21 (the center in the circumferential direction of the pole formed when the coil 29 is supplied with current) slightly toward the rear in the rotation direction of the commutator 25. Thus, when the brushes 41 to 43 are arranged in the order of the common brush 41, the high-speed drive brush 43, and the low-speed drive brush 42 from the rear side to the front side in the rotation direction of the commutator 25, the magnetic center formed in the armature 21 when supplying current with the high-speed drive brush 43 is located near the magnetic center formed in the armature 21 when supplying power with the low-speed drive brush 42. As a result, the wiper motor may be used more effectively without adversely affecting the performance of the wiper motor when the wiper motor is driven at a low speed and when driven at a high speed as compared to when the brushes 41 to 43 are arranged in the order of the low-speed drive brush 42, the high-speed drive brush 43, and the common brush 41 from the rear side to the front side with respect to the rotation direction of the commutator 25.

(4) The armature core 24 includes fourteen slots 24b, and the number obtained by dividing the total number of slots (i.e., "14") by two is an odd number (i.e., "7"). In other words, the number of slots per one magnetic circuit is an odd number. As a result, in the wiper motor of the present embodiment including the magnet 12 that forms four magnetic pole portions, a structure in which the common brush 41, the low-speed drive brush 42, and the high-speed drive brush 43 alternately and singly short-circuit two circumferentially adjacent segments 27 is easily realized.

Second Embodiment

A wiper motor according to a second embodiment of the present invention will now be discussed with reference to the drawings. In the second embodiment, like or same reference numerals are given to those components that are the same as the corresponding components of the first embodiment. Such components will not be described.

Figure 7:
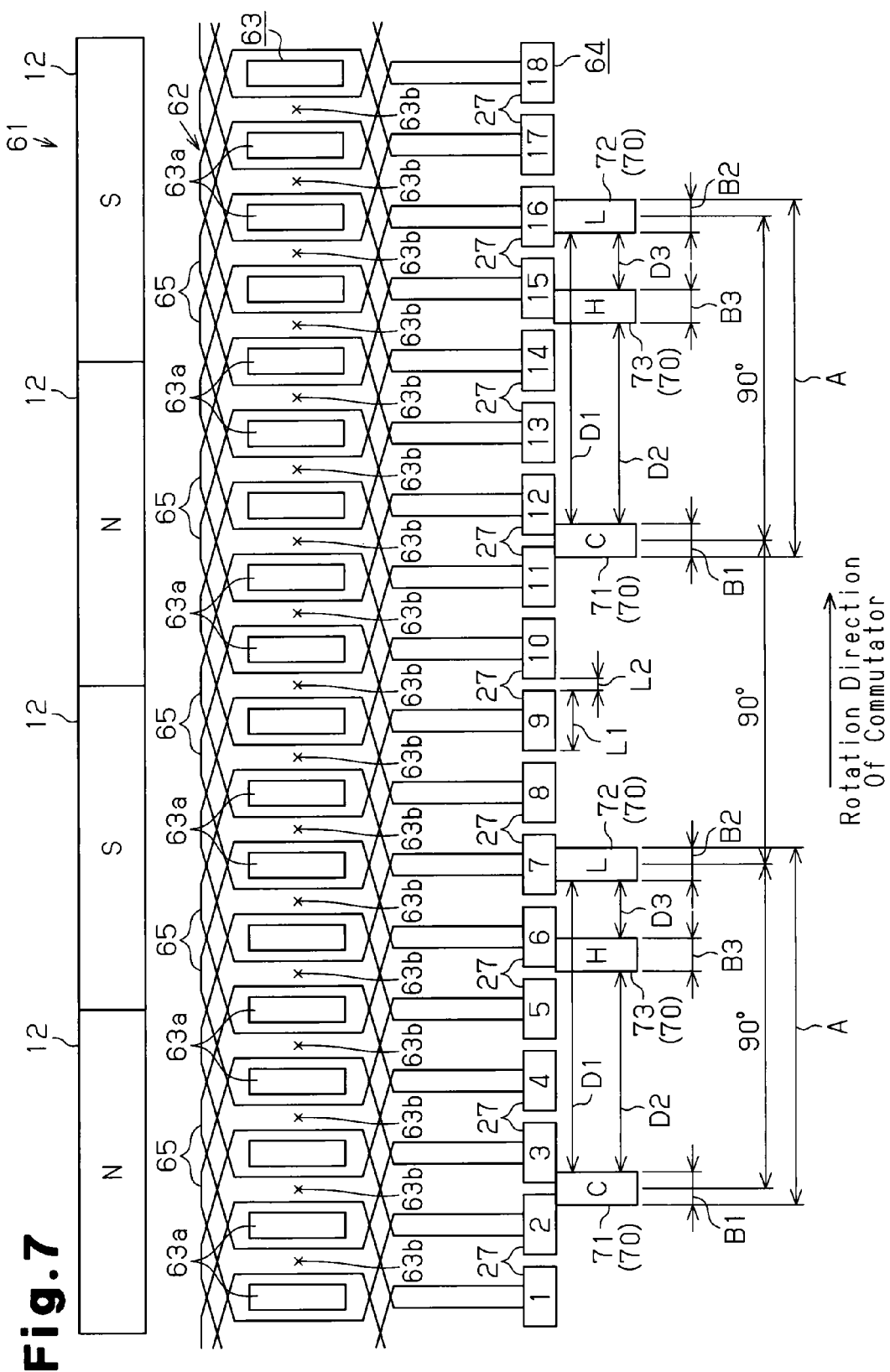
FIG. 7 is a schematic diagram in which a motor unit of the second embodiment is laid out along a plane.

FIG. 7 is a schematic diagram in which a motor unit and power supply brushes of the second embodiment are laid out along a plane. As shown in FIG. 7, the wiper motor of the second embodiment has a motor unit 61 including a yoke housing 11, which is similar to that of the motor unit 1 in the first embodiment, and at least one magnet forming four magnetic pole portions (two N poles and two S poles) fixed to an inner circumferential surface of the yoke housing 11 (refer to FIG. 1). An armature 62 is rotatably arranged at a radially inner side of the magnet 12. The armature 62 includes a rotation shaft 22, an armature core 63, which is fixed to the rotation shaft 22 in an integrally rotatable manner, a commutator 64, which is fixed to the rotation shaft 22 in an integrally rotatable manner at a location closer to the reduction gear 2 than the armature core 63, and a plurality of coils 65, which are wound around the armature core 63.

The armature core 63 is arranged facing the magnet 12 in the radial direction and is fixed to the rotation shaft 22 so as to be integrally rotatable with the rotation shaft 22. The armature core 63 includes eighteen teeth 63a, which extend radially outward about the rotation shaft 22. A slot 63b is formed between the teeth 63a that are adjacent to each other in the circumferential direction of the armature core 63.

Figure 9A:
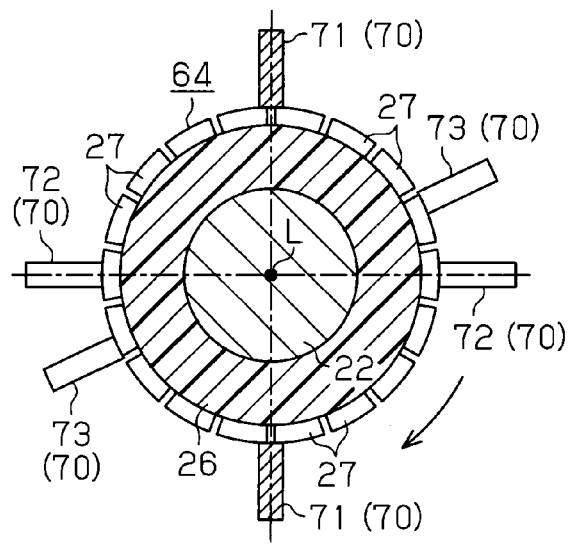
FIGS. 9(a) to 9(d) are diagrams showing the positional relationship of the commutator and the three brushes in the second embodiment.

As shown in FIG. 9(a), the commutator 64 includes an insulator 26 and eighteen segments 27 fixed to the outer circumferential surface of the insulator 26. The eighteen segments 27 are arranged at equal angular intervals in the circumferential direction, and adjacent ones of the segments 27 are spaced apart from each other in the circumferential direction of the rotation shaft 22. As shown in FIG. 7, the eighteen segments 27 are numbered in order from "1" to "18" along the circumferential direction.

As shown in FIG. 7, eighteen coils 65 are wound in an overlapping manner about the teeth 63a. Each coil 65 is wound around the armature core 63 extending through the slots 63b across four teeth 63a, which are arranged successively in the circumferential direction. Each coil 65 has an initial winding end connected to one of the segments 27 and a terminal winding end connected to another one of the segments 27, which is the adjacent one in the circumferential direction.

In the same manner as the motor unit 1 of the first embodiment, the motor unit 61 is coupled to a reduction gear 2. In the second embodiment, a brush holder 32 (refer to FIG. 2) of the reduction gear 2 holds six power supply brushes 70, each having the form of a tetragonal rod extending in the radial direction. Among the six power supply brushes 70, two are common brushes 71, two are low-speed drive brushes 72, and the remaining two are high-speed drive brushes 73. As shown in FIG. 9(a), the six power supply brushes 70 are arranged in the order of the common brush 71, the high-speed drive brush 73, the low-speed drive brush 72 and so on from the rear side to the front side in the rotation direction of the commutator 64 (i.e., the rotation direction of the armature 62). In FIG. 9(a), the arrows show the rotation direction of the commutator 64. Further, the two common brushes 71 are arranged in symmetry at opposite sides of the center axis L of the commutator 64 (i.e., in a 180° interval in the circumferential direction). The two low-speed drive brushes 72 and the two high-speed drive brushes 73 are also arranged in symmetry at opposite sides of the center axis L Each power supply brush 70 is urged towards the commutator 64 by a spring or the like (not shown) and has a distal portion slidably pressed against the outer circumferential surface of the commutator 64 (i.e., surface at radially outward side of each segment 27). The common brushes 71 function as anode brushes, and the low-speed drive brushes 72 and high-speed drive brushes 73 function as cathode brushes. Each power supply brush 70 is connected to a pigtail (not shown) in the same manner as the power supply brushes 40 of the first embodiment. The pigtails supply current to the power supply brushes 70.

The widths and locations of the six power supply brushes 70 (i.e., the two common brushes 71, the two low-speed drive brushes 72, and the two high-speed drive brushes 73) in the circumferential direction of the rotation shaft 22 will now be described in detail. Referring to FIG. 7, in the wiper motor of the present embodiment, the width and location of each of the brushes 71 to 73 in the circumferential direction are set so as to repeat a single type short-circuit state (short-circuit state) and a non-short-circuit state. In the single type short-circuit state, just one of the three types of power supply brushes 70, which are the common brushes 71, the low-speed drive brushes 72, and the high-speed drive brushes 73, short-circuit two segments 27 that are adjacent to each other in the circumferential direction. In the non-short-circuit state, none of the brushes 70 short-circuit two segments 27 that are adjacent to each other in the circumferential direction.

First, the number P of magnetic pole portions formed by the magnet 12 is set to a value satisfying the expression of P≧4. The number of teeth 63a and the number of segments 27 are set to be the same in the wiper motor. If the number of teeth 63a (i.e., number of segments 27) is S, the value of S is set such that (2S/P) is an odd number. In the present embodiment, the expressions of P=4 and S=18 are satisfied. Thus, the expression (2S/P) results in a value of "9", which is an odd number.

With respect to the circumferential direction of the rotation shaft 22, the width of the segment 27 is represented by L1, the interval between adjacent ones of segments 27 is represented by L2, the width of the common brush 71 is represented by B1, the width of the low-speed drive brush 72 is represented by B2, the width of the high-speed drive brush 73 is represented by B3, the width of the layout area of each set of the three brushes 71 to 73 in which the high-speed drive brush 73 is located at the middle is represented by A, the interval between the common brush 71 and the low-speed drive brush 72 located at opposite sides of the high-speed drive brush 73 is represented by D1, the interval between the common brush 71 and the high-speed drive brush 73 is represented by D2, and the interval between the high-speed drive brush 73 and the low-speed drive brush 72 is represented by D3. In this case, these values are each set to satisfy the conditions shown below.

$B1 > L2, B2 > L2, B3 > L2,$ $A < (n \times L1 + (n+1) \times n2),$ $D1 > ((n-1) \times L1 + (n-2) \times L2),$ $D2 > (n1 \times L1 + (n1-1) \times L2),$ $D3 > (n2 \times L1 + (n2-1) \times L2),$ $n = n1 + n2 + 1$ Here, "n" is a value that is the same as the number of segments 27 arranged in an angular range of (360°/P). In other words, "n" is a quotient obtained by dividing the number of segments 27 (i.e., equal to the number S of the teeth 63a) in the motor unit 61 by the number P of magnetic pole portions. When the quotient is not an integer, the rounded up number is used as "n". Further, "n1" and "n2" are positive integers satisfying "n=n1+n2+1". Like in the present embodiment, when the number P of magnetic pole portions formed in the magnet is "4" and the number of segments 27 is "14", for example, the setting are N=5, N1=2, and N2=2

In the present embodiment, the circumferential widths and locations of the common brushes 71, the low-speed drive brushes 72, and the high-speed drive brushes 73 are set so that the circumferential widths B1, B2, and B3 are of the same value and narrower than the circumferential width of the segments 27. Further, the common brush 71 and the low-speed drive brush 72 are arranged on opposite sides of the high-speed drive brush 73 at a 90° interval, which is the same as the angular interval between adjacent ones of the magnetic pole portions formed in the magnet 12.

The relationship of the commutator 64 and the brushes 71 to 73 when the commutator 64 is rotated in the wiper motor of the present embodiment, which has the common brushes 71, the low-speed drive brushes 72, and the high-speed drive brushes 73 arranged near the commutator 25 so as to satisfy the above conditions, will now be discussed with reference to FIGS. 8(a) to 9(d). FIGS. 8(a) to 8(d) are schematic diagrams showing portions taken from FIG. 7 that require to be described. Further, FIGS. 8(a) to 8(d) show only one set of the brushes 71 to 73 but the relationship is the same for the remaining set of the three brushes 71 to 73 and the commutator 64. In FIGS. 8(a) to 9(d), the rotation direction of the commutator 64 is indicated by an arrow.

Figure 8A:
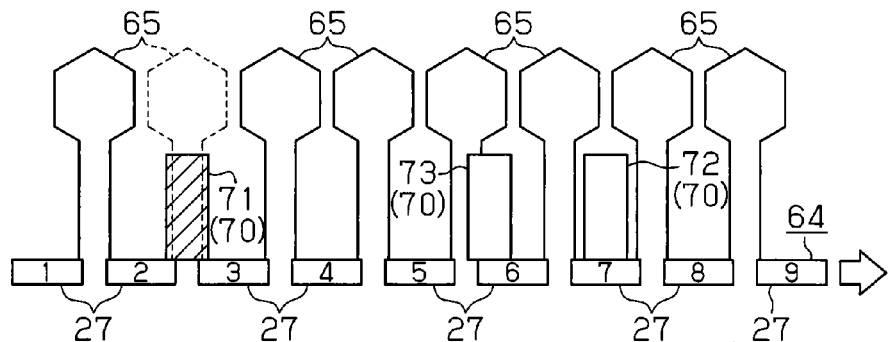
FIGS. 8(a) to 8(d) are diagrams showing the positional relationship of a commutator and three brushes in the second embodiment.

In FIGS. 8(a) and 9(a), the common brush 71 short-circuits the number "2" and "3" segments 27, which are adjacent to each other in the circumferential direction. In FIGS. 8 and 9, the power supply brush 70 that is short-circuiting two segments 27 that are adjacent to each other in the circumferential direction are shown by hatching lines. In this state, the high-speed drive brush 73 has one circumferential end (rear end in the rotation direction of the commutator 64) arranged between the number "5" and "6" segments 27, which are adjacent to each other in the circumferential direction. The high-speed drive brush 73 contacts only the number "6" segment 27 and does not contact the number "5" segment 27. Further, the low-speed drive brush 72 contacts only the number "7" segment 27. In this manner, FIGS. 8(a) and 9(a) show a single type short-circuit state, in which just the common brushes 71 short-circuit two segments 27 that are adjacent to each other in the circumferential direction. Thus, among the eighteen coils 65, only two coils 65 undergo commutation (refer to the coil 65 shown by broken lines in FIG. 8(a)) and the remaining sixteen are supplied with current. In this state, there are sixteen effective coils.

Figure 8B:
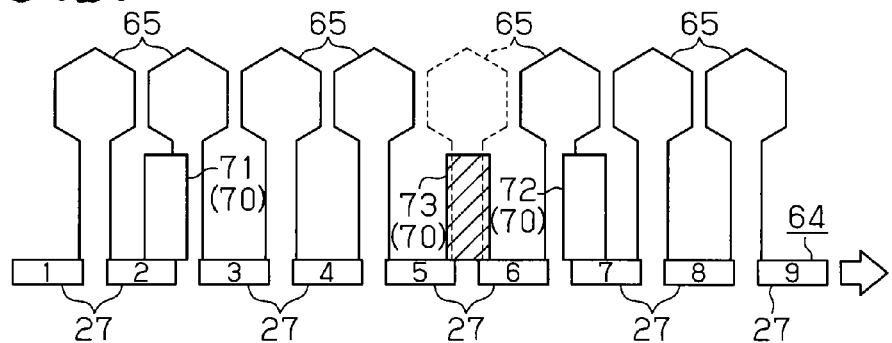
Figure 9B:
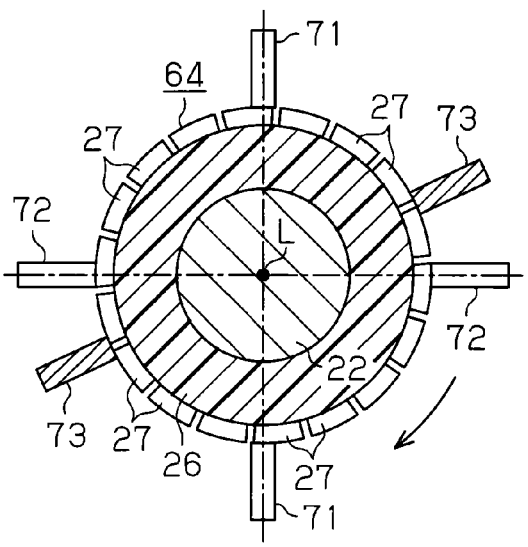

When shifting from the state shown in FIGS. 8(a) and 9(a) to the state shown in FIGS. 8(b) and 9(b), the high-speed drive brush 73 short-circuits the number "5" and "6" segments 27, which are adjacent to each other in the circumferential direction. In this state, the common brush 71 ends the short-circuiting of two adjacent segments 27 and has one circumferential end (front end in the rotation direction of the commutator 64) arranged between the number "2" and "3" segments 27. The common brush 71 contacts only the number "2" segment 27 and does not contact the number "3" segment 27. Further, the low-speed drive brush 72 has one circumferential end (rear end in the rotation direction of the commutator 64) arranged between the number "6" and "7" segments 27, which are adjacent to each other in the circumferential direction. The low-speed drive brush 72 contacts only the number "7" segment 27 and does not contact the number "6" segment 27. In this manner, FIGS. 8(b) and 9(b) show a single type short-circuit state, in which just the high-speed drive brushes 73 short-circuit two segments 27 that are adjacent to each other in the circumferential direction. Thus, among the eighteen coils 65, only two coils 65 undergo commutation (refer to the coil 65 shown by broken lines in FIG. 8(b)) and the remaining sixteen are supplied with current. In this state, there are sixteen effective coils.

Figure 8C:
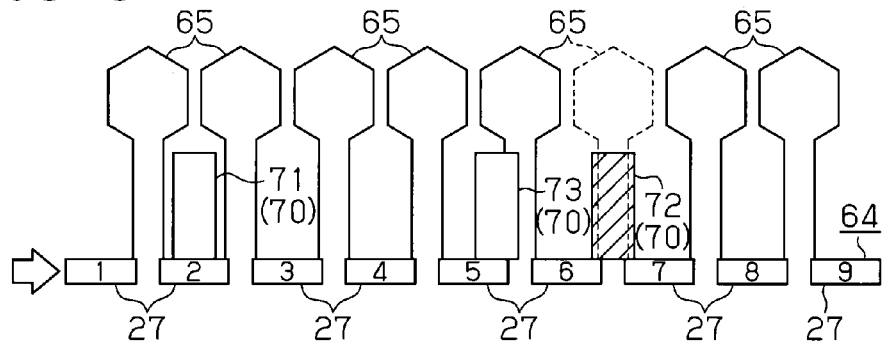
Figure 9C:
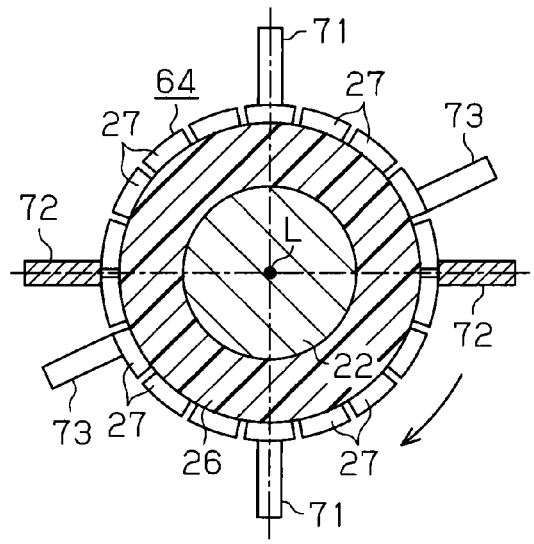

Then, when shifting to the state shown in FIGS. 8(c) and 9(c), the low-speed drive brush 72 short-circuits the number "6" and "7" segments 27, which are adjacent to each other in the circumferential direction. In this state, the high-speed drive brush 73 ends the short-circuiting of two adjacent segments 27 and has one circumferential end (front end in the rotation direction of the commutator 64) arranged between the number "5" and "6" segments 27. The high-speed drive brush 73 contacts only the number "5" segment 27 and does not contact the number "6" segment 27. Further, the common brush 71 contacts only the number "2" segment 27. In this manner, FIGS. 8(c) and 9(c) show a single type short-circuit state, in which just the low-speed drive brushes 72 short-circuit two segments 27 that are adjacent to each other in the circumferential direction. Thus, among the eighteen coils 65, only two coils 65 undergo commutation (refer to the coil 65 shown by broken lines in FIG. 8(b)) and the remaining sixteen are supplied with current. In this state, there are sixteen effective coils.

Figure 8D:
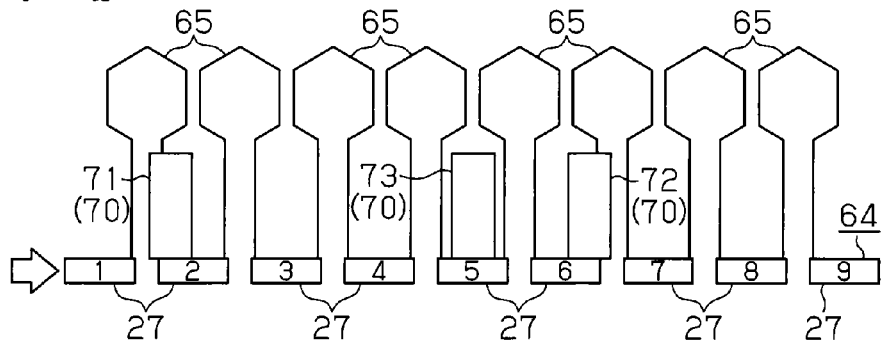
Figure 9D:
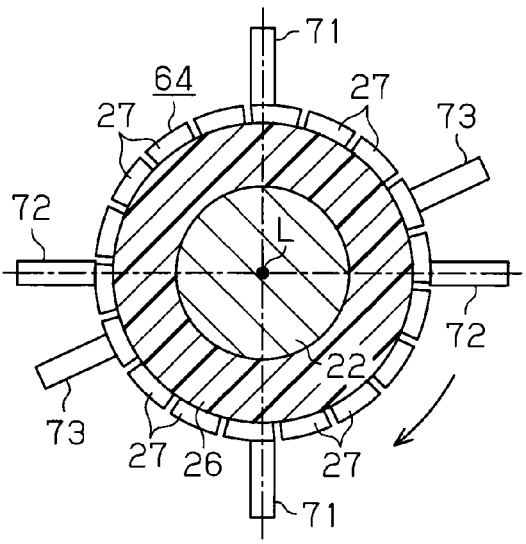

Next, when shifting to the state shown in FIGS. 8(d) and 9(d), the low-speed drive brush 72 ends the short-circuiting of two adjacent segments 27 and has one circumferential end (front end in the rotation direction of the commutator 64) arranged between the number "6" and "7" segments 27. The low-speed drive brush 72 contacts only the number "6" segment 27 and does not contact the number "7" segment 27. Further, the common brush 71 has one circumferential end (rear end in the rotation direction of the commutator 64) arranged between the number "1" and "2" segments 27. The common brush 71 contacts only the number "2" segment 27 and does not contact the number "1" segment 27. Further, the high-speed drive brush 73 contacts only the number "5" segment 27. In this manner, FIGS. 8(d) and 9(d) show a non-short-circuit state, in which none of the common brushes 71, low-speed drive brushes 72, and high-speed drive brushes 73 short-circuit two segments 27 that are adjacent to each other in the circumferential direction. Thus, in this state, there are eighteen effective coils.

When the commutator 64 further rotates and shifts to the state shown in FIGS. 8(a) and 9(a), rotation of the armature 62 repeats states similar to the states shown in FIGS. 8(a) to 8(d) and FIGS. 9(a) to 9(d). In other words, rotation of the armature 62 repeats the single type short-circuit state in which just the two common brushes 71 short-circuit two segments 27 that are adjacent to each other in the circumferential direction, the single type short-circuit state in which just the two high-speed drive brushes 73 short-circuit two segments 27 that are adjacent to each other in the circumferential direction, the single type short-circuit state in which just the two low-speed drive brushes 72 short-circuit two segments 27 that are adjacent to each other in the circumferential direction, and the non-short-circuit state in which none of the common brushes 71, low-speed drive brushes 72, and high-speed drive brushes 73 short-circuit two segments 27 that are adjacent to each other in the circumferential direction. Thus, among the three types of the common brushes 71, low-speed drive brushes 72, and high-speed drive brushes 73, two types never simultaneously short-circuit two segments 27 that are adjacent to each other in the circumferential direction, and all of the brushes never simultaneously short-circuit two segments 27 that are adjacent to each other in the circumferential direction. Further, as shown in FIGS. 8 and 9, in the present embodiment, the power supply brushes 70 (brushes 71 to 73) that short-circuit two segments 27 adjacent to each other in the circumferential direction shift in the same direction as the rotation direction of the commutator 64 (toward the front in the rotation direction).

In addition to advantages (3) and (4) of the first embodiment, the second embodiment has the advantages described below.

(1) The common brushes 71, low-speed drive brushes 72, and high-speed drive brushes 73 never all simultaneously short-circuit two segments 27 that are adjacent to each other in the circumferential direction. Thus, the number of effective coils does not change, and the resistance fluctuation of the coils 29 is minimized. As a result, fluctuation in the value of the supplied current is minimized, and torque fluctuation is minimized. This prevents the wiper motor from vibrating and thereby keeps the generated noise subtle. Further, the number of effective coils is minimized.

(2) The common brushes 71, low-speed drive brushes 72, and high-speed drive brushes 73 sequentially short-circuit two segments 27 adjacent to each other in the circumferential direction. Thus, the number of effective coils is prevented from suddenly changing. This prevents the wiper motor from vibrating.

(3) The single type short-circuit state and non-short-circuit state are repeated. Thus, two or more types of the brushes never simultaneously short-circuit two segments 27 adjacent to each other in the circumferential direction. Accordingly, changes in the number of effective coils are further decreased, and the resistance fluctuation of the coil 65 is further decreased. As a result, changes in the value of the supplied current are further suppressed, and torque fluctuation is further suppressed. Further, in a non-short-circuit state, all of the coils 65 are effective coils. Thus, the coils 65 may be used effectively.

(4) The widths and locations of the common brushes 71, the low-speed drive brushes 72, and the high-speed drive brushes 73 in the circumferential direction are set based on the conditions of B1>L2, B2>L2, B3>L2, A<(n×L1+(n+1)×L2), D1>((n−1)×L1+(n−2)×L2), D2>(n1×L1+(n1−1)×L2), D3>(n2×L1+(n2−1)×L2), n=n1+n2+1. By setting each value so as to satisfy the above conditions, a structure in which the non-short-circuit state and the single type short-circuit state are repeated is easily realized.

Third Embodiment

A wiper motor according to a third embodiment of the present invention will now be discussed with reference to the drawings. In the third embodiment, like or same reference numerals are given to those components that are the same as the corresponding components of the first embodiment. Such components will not be described.

Figure 13A:
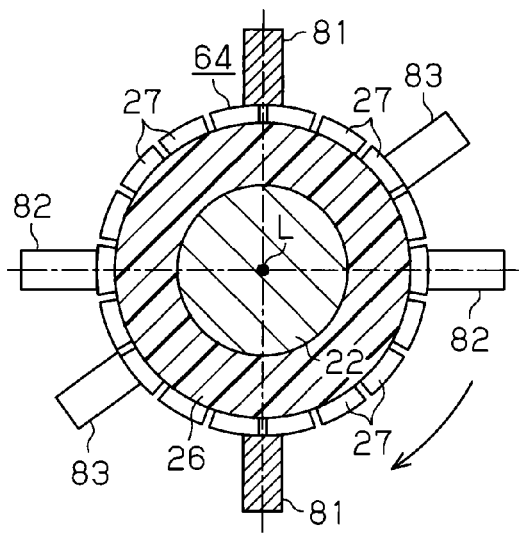
FIGS. 13(a) to 13(d) are diagrams showing the positional relationship of the commutator and the three brushes in the third embodiment.

FIG. 10 is a schematic diagram in which a motor unit and power supply brushes of the third embodiment are laid out along a plane. As shown in FIG. 10, in the third embodiment, a brush holder 32 (refer to FIG. 2) of the reduction gear 2 holds six power supply brushes 80, each having the form of a tetragonal rod extending in the radial direction. Among the six power supply brushes 80, two are common brushes 81, two are low-speed drive brushes 82, and the remaining two are high-speed drive brushes 83. As shown in FIG. 13(a), the six power supply brushes 80 are arranged in the order of the common brush 81, the high-speed drive brush 83, and the low-speed drive brush 82 from the rear side to the front side in the rotation direction of the commutator 64 (i.e., the rotation direction of the armature 62). In FIG. 13(a), the arrows show the rotation direction of the commutator 64. Further, the two common brushes 81 are arranged in symmetry at opposite sides of the center axis L of the commutator 64 (i.e., in a 180° interval in the circumferential direction). The two low-speed drive brushes 82 and the two high-speed drive brushes 83 are also arranged in symmetry at opposite sides of the center axis L Each power supply brush 80 is urged towards the commutator 64 by a spring or the like (not shown) and has a distal portion slidably pressed against the outer circumferential surface of the commutator 64 (i.e., surface at radially outward side of each segment 27). The common brushes 81 function as anode brushes, and the low-speed drive brushes 82 and high-speed drive brushes 83 function as cathode brushes. Each power supply brush 80 is connected to a pigtail (not shown) in the same manner as the power supply brushes 40 of the first embodiment. The pigtails supply current to the power supply brushes 80.

The widths and locations of the six power supply brushes 80 (i.e., the two common brushes 81, the two low-speed drive brushes 82, and the two high-speed drive brushes 83) in the circumferential direction of the rotation shaft 22 will now be described in detail. Referring to FIG. 10, in the wiper motor of the present embodiment, the width and location of each of the brushes 81 to 73 in the circumferential direction are set so as to repeat a double type short-circuit state (short-circuit state), a single type short-circuit state (short-circuit state), and a non-short-circuit state. In the double type short-circuit state, two of the three types of power supply brushes 80, which are the common brushes 81, the low-speed drive brushes 82, and the high-speed drive brushes 83, short-circuit two segments 27 that are adjacent to each other in the circumferential direction. In the single type short-circuit state, just one type of the power supply brushes 80 short-circuit two segments 27 that are adjacent to each other in the circumferential direction. In the non-short-circuit state, none of the brushes 80 short-circuit two segments 27 that are adjacent to each other in the circumferential direction.

First, the number P of magnetic pole portions formed by the magnet 12 is set to a value satisfying the expression of P≧4. The number of teeth 63a and the number of segments 27 are set to be the same in the wiper motor. If the number of teeth 63a (i.e., number of segments 27) is S, the value of S is set such that (2S/P) is an odd number. In the present embodiment, the expressions of P=4 and S=18 are satisfied. Thus, the expression (2S/P) results in a value of "9", which is an odd number.

With respect to the circumferential direction of the rotation shaft 22, the width of the segment 27 is represented by L1, the interval between adjacent ones of segments 27 is represented by L2, the width of the common brush 81 is represented by B1, the width of the low-speed drive brush 82 is represented by B2, the width of the high-speed drive brush 83 is represented by B3, the width of the layout area of each set of the three brushes 81 to 83 in which the high-speed drive brush 83 is located at the middle is represented by A. In this case, these values are each set to satisfy the conditions shown below.

$L2 < B1 < (L1 + 2 \times L2)$, $L2 < B2 < (L1 + 2 \times L2)$, $L2 < B3 < (L1 + 2 \times L2)$, $A < (n \times L1 + (n+1) \times L2)$.

Here, "n" is a value that is the same as the number of segments 27 arranged in an angular range of (360°/P). In other words, "n" is a quotient obtained by dividing the number of segments 27 (i.e., to the number S of the teeth 63a) in the motor unit 61 by the number P of magnetic pole portions. When the quotient is not an integer, the rounded up number is used as "n".

In the present embodiment, the circumferential widths and locations of the common brushes 81, the low-speed drive brushes 82, and the high-speed drive brushes 83 are set so that the circumferential widths B1, B2, and B3 are of the same value and narrower than the circumferential width of the segments 27. Further, the common brush 81 and the low-speed drive brush 82 are arranged on opposite sides of the high-speed drive brush 83 at a 90° interval, which is the same as the angular interval between adjacent ones of the magnetic pole portions formed in the magnet 12.

The relationship of the commutator 64 and the brushes 81 to 83 when the commutator 64 is rotated in the wiper motor of the present embodiment, which has the common brushes 81, the low-speed drive brushes 82, and the high-speed drive brushes 83 arranged near the commutator 25 so as to satisfy the above conditions, will now be discussed with reference to FIGS. 11(a) to 14(d). FIGS. 11(a) to 12(d) are schematic diagrams showing portions taken from FIG. 10 that require to be described. Further, FIGS. 11(a) to 12(d) show only one set of the brushes 71 to 73 but the relationship is the same for the remaining set of the three brushes 81 to 83 and the commutator 64. In FIGS. 11(a) to 14(d), the rotation direction of the commutator 64 is indicated by an arrow.

Figure 11A:
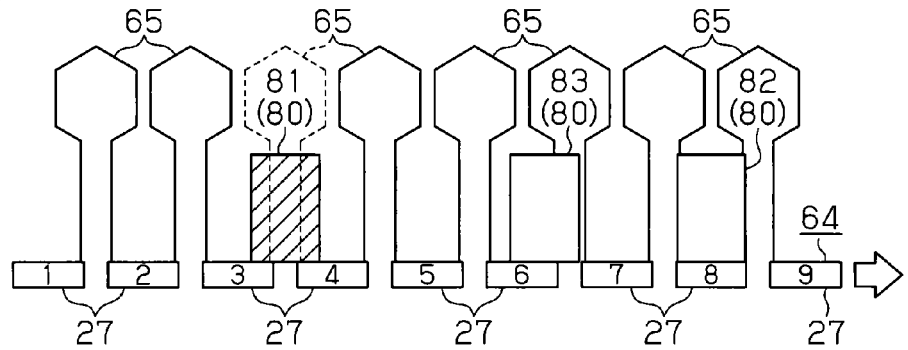
FIGS. 11(a) to 11(d) are diagrams showing the positional relationship of a commutator and three brushes in the third embodiment.

In FIGS. 11(a) and 13(a), the common brush 81 short-circuits the number "3" and "4" segments 27, which are adjacent to each other in the circumferential direction. In FIGS. 11(a) to 14(d), the power supply brush 80 that is short-circuiting two segments 27 that are adjacent to each other in the circumferential direction are shown by hatching lines. In this state, the high-speed drive brush 83 has one circumferential end (front end in the rotation direction of the commutator 64) arranged between the number "6" and "7" segments 27, which are adjacent to each other in the circumferential direction. The high-speed drive brush 83 contacts only the number "6" segment 27 and does not contact the number "7" segment 27. Further, the low-speed drive brush 82 contacts only the number "8" segment 27. In this manner, FIGS. 11(a) and 13(a) show a single type short-circuit state, in which just the common brushes 81 short-circuit two segments 27 that are adjacent to each other in the circumferential direction. Thus, among the eighteen coils 65, only two coils 65 undergo commutation (refer to the coil 65 shown by broken lines in FIG. 11(a)) and the remaining sixteen coils 65 are supplied with current. In this state, there are sixteen effective coils.

Figure 11B:
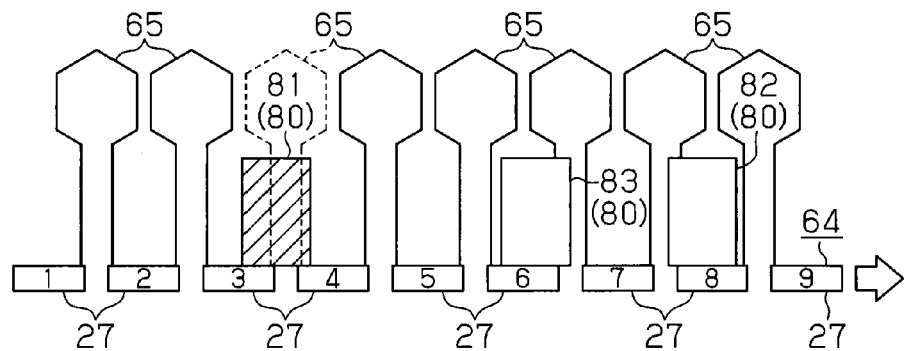
Figure 13B:
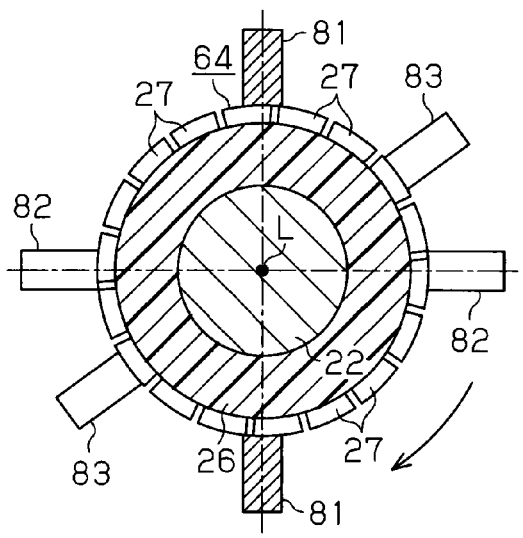

When shifting from the state shown in FIGS. 11(a) and 13(a) to the state shown in FIGS. 11(b) and 13(b), the common brush 81 short-circuits the number "3" and "4" segments 27, which are adjacent to each other in the circumferential direction, in a manner similar to the state shown in FIGS. 11(a) and 13(a). Further, the high-speed drive brush 83 contacts only the number "6" segment 27, and the low-speed drive brush 82 contacts only the number "8" segment 27. Thus, the single type short-circuit state is maintained, in which just the common brushes 81 short-circuit two segments 27 that are adjacent to each other in the circumferential direction.

Figure 11C:
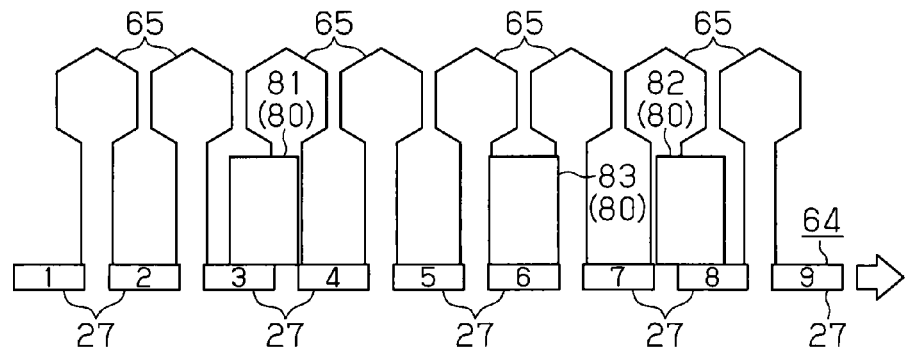
Figure 13C:
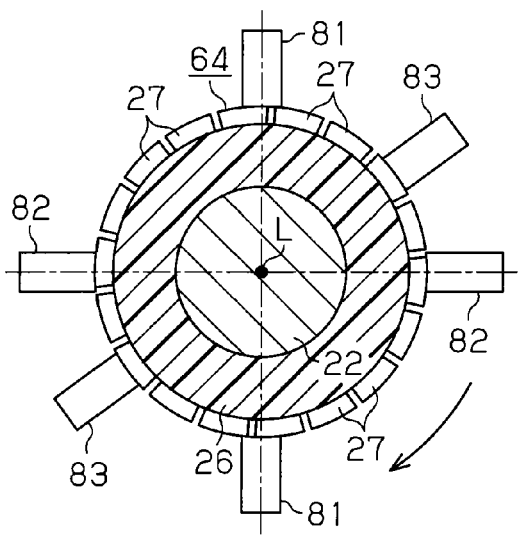

As the commutator 64 further rotates and shifts to the states shown in FIGS. 11(c) and 13(c), the common brush 81 ends the short-circuiting of two adjacent segments 27 and has one circumferential end (front end in the rotation direction of the commutator 25) arranged between the number "3" and "4" segments 27. The common brush 81 contacts only the number "3" segment 27 and does not contact the number "4" segment 27. Further, the high-speed drive brush 83 contacts only the number "6" segment 27. The low-speed drive brush 82 has one circumferential end (rear end in the rotation direction of the commutator 64) arranged between the number "7" and "8" segments 27, which are adjacent to each other in the circumferential direction. The low-speed drive brush 82 contacts only the number "8" segment 27 and does not contact the number "7" segment 27. In this manner, FIGS. 11(c) and 13(c) show a non-short-circuit state, in which none of the common brushes 81, the low-speed drive brushes 82, and the high-speed drive brushes 83 short-circuit two segments 27 that are adjacent to each other in the circumferential direction. Thus, all eighteen coils 65 are supplied with current. In this state, there are eighteen effective coils.

Figure 11D:
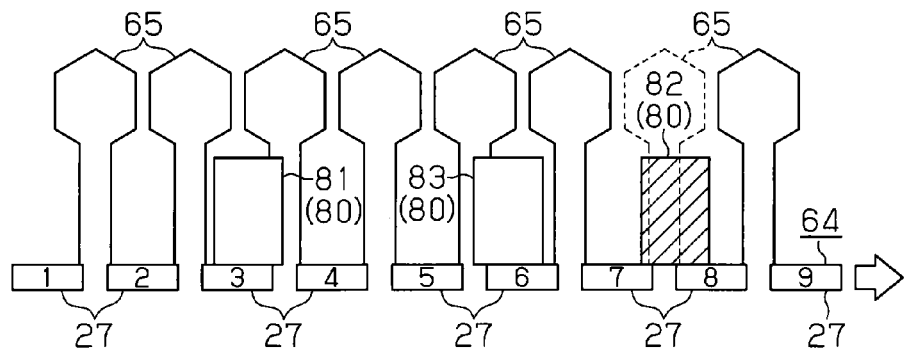
Figure 13D:
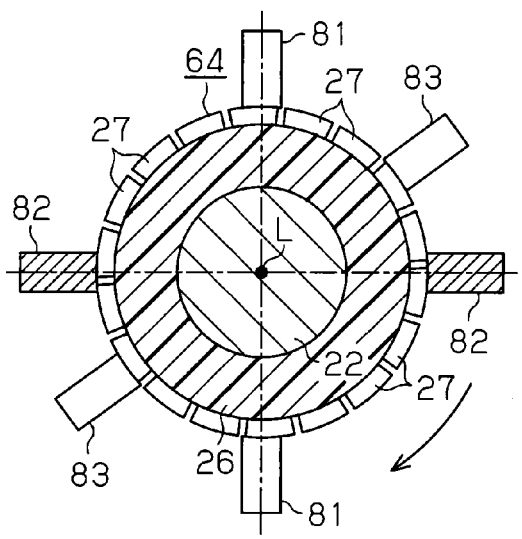

Then, when shifting to the state shown in FIGS. 11(d) and 13(d), the low-speed drive brush 82 short-circuits the number "7" and "8" segments 27, which are adjacent to each other in the circumferential direction. In this state, the common brush 81 has one circumferential end (front end in the rotation direction of the commutator 64) arranged between the number "3" and "4" segments 27. The common brush 81 contacts only the number "3" segment 27 and does not contact the number "4" segment 27. Further, the high-speed drive brush 83 has one circumferential end (rear end in the rotation direction of the commutator 64) arranged between the number "5" and "6" segments 27. The high-speed drive brush 83 contacts only the number "6" segment 27 and does not contact the number "5" segment 27. In this manner, FIGS. 11(d) and 13(d) show a single type short-circuit state, in which just the low-speed drive brushes 82 short-circuit two segments 27 that are adjacent to each other in the circumferential direction. Thus, among the eighteen coils 65, only two coils 65 undergo commutation (refer to the coil 65 shown by broken lines in FIG. 11(d)) and the remaining sixteen coils 65 are supplied with current. In this state, there are sixteen effective coils.

Figure 12A:
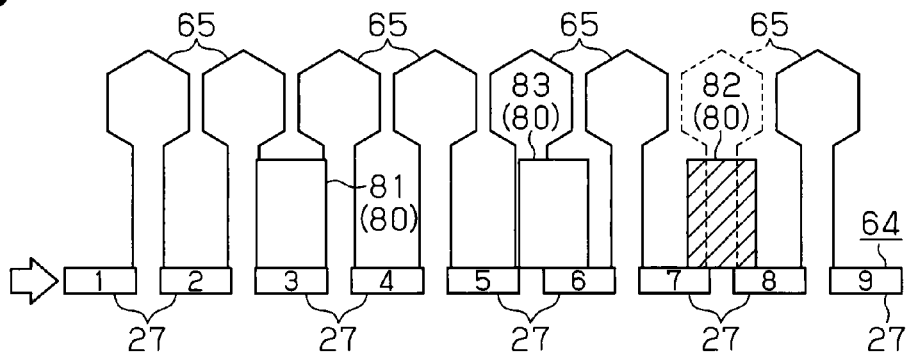
FIGS. 12(a) to 12(d) are diagrams showing the positional relationship of the commutator and the three brushes in the third embodiment.
Figure 14A:
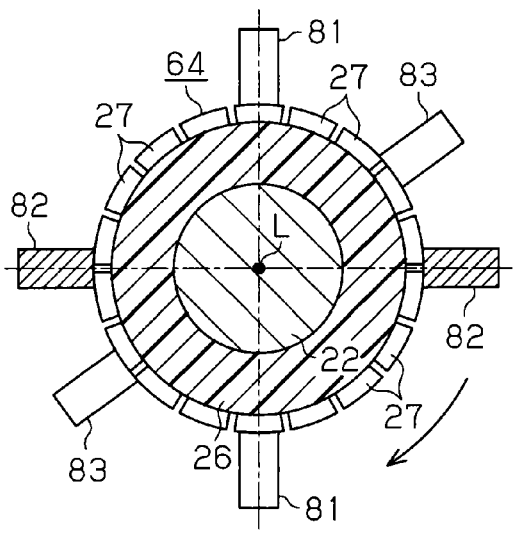
FIGS. 14(a) to 14(d) are diagrams showing the positional relationship of the commutator and the three brushes in the third embodiment.

When shifting from the state shown in FIGS. 11(d) and 13(d) to the state shown in FIGS. 12(a) and 14(a), the low-speed drive brush 82 short-circuits the number "7" and "8" segments 27, which are adjacent to each other in the circumferential direction, in a manner similar to the state shown in FIGS. 11(d) and 13(d). Further, the common brush 81 contacts only the number "3" segment 27, and the high-speed drive brush 83 contacts only the number "6" segment 27. Thus, the single type short-circuit state is maintained, in which just the low-speed drive brushes 82 short-circuit two segments 27 that are adjacent to each other in the circumferential direction.

Figure 12B:
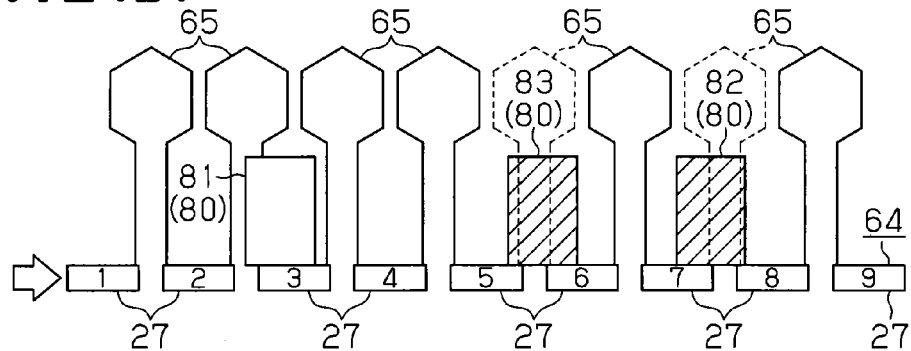
Figure 14B:
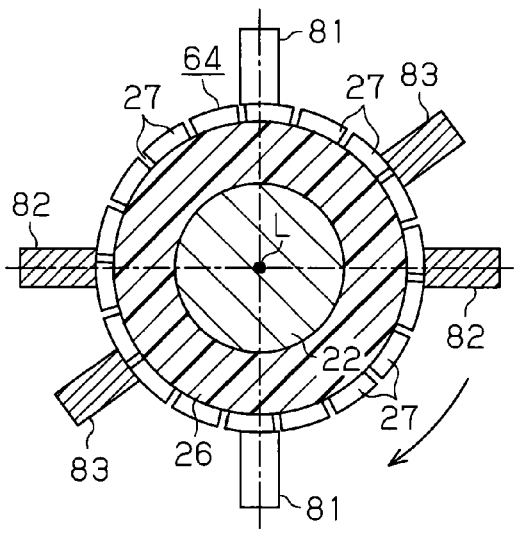

Next, when shifting to the state shown in FIGS. 12(b) and 14(b), in addition to the low-speed drive brush 82, the high-speed drive brush 83 short-circuits the number "5" and "6" segments 27, which are adjacent to each other in the circumferential direction. In this state, the common brush 81 has one circumferential end (rear end in the rotation direction of the commutator 64) arranged between the number "2" and "3" segments 27. The common brush 81 contacts only the number "3" segment 27 and does not contact the number "2" segment 27. In this manner, FIGS. 12(b) and 14(b) show a double type short-circuit state, in which two types of brushes, namely, the low-speed drive brushes 82 and the high-speed drive brushes 83, short-circuit two segments 27 that are adjacent to each other in the circumferential direction. Thus, among the eighteen coils 65, only four coils 65 undergo commutation (refer to the coils 65 shown by broken lines in FIG. 12(b)) and the remaining fourteen coils 65 are supplied with current. In this state, there are fourteen effective coils.

Figure 12C:
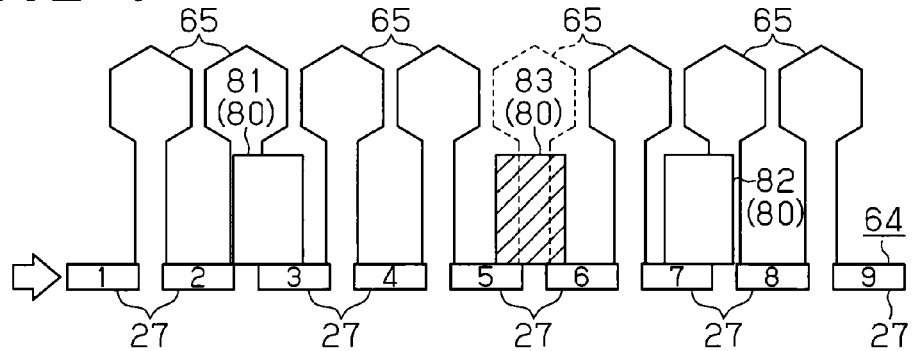
Figure 14C:
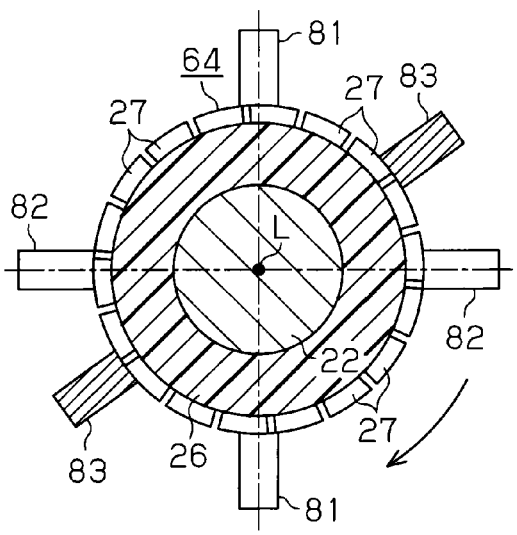

Then, when shifting to the state shown in FIGS. 12(c) and 14(c), the low-speed drive brush 82 ends the short-circuiting of two adjacent segments 27 and has one circumferential end (front end in the rotation direction of the commutator 64) arranged between the number "7" and "8" segments 27. The low-speed drive brush 82 contacts only the number "7" segment 27 and does not contact the number "8" segment 27. Further, the high-speed drive brush 83 remains short-circuited to the number "5" and "6" segments 27 that are adjacent to each other in the circumferential direction, and the common brush 81 remains in contact with only the number "3" segment 27. In this manner, FIGS. 12(c) and 14(c) show a single type short-circuit state, in which just the high-speed drive brushes 83 short-circuit two segments 27 that are adjacent to each other in the circumferential direction. Thus, among the eighteen coils 65, only two coils 65 undergo commutation (refer to the coil 65 shown by broken lines in FIG. 11(d)) and the remaining sixteen coils 65 are supplied with current. In this state, there are sixteen effective coils.

Figure 12D:
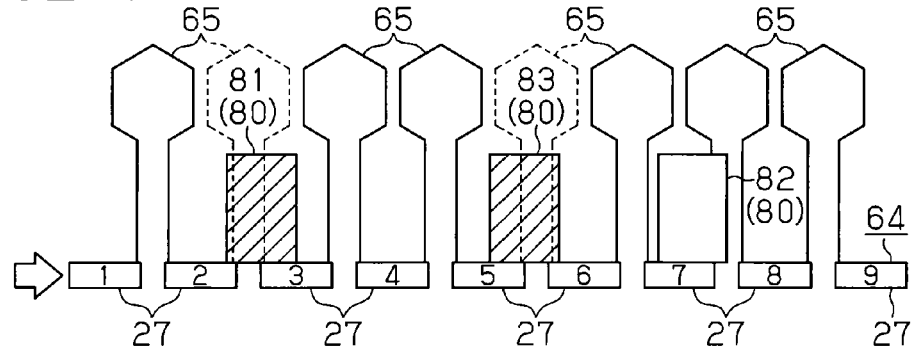
Figure 14D:
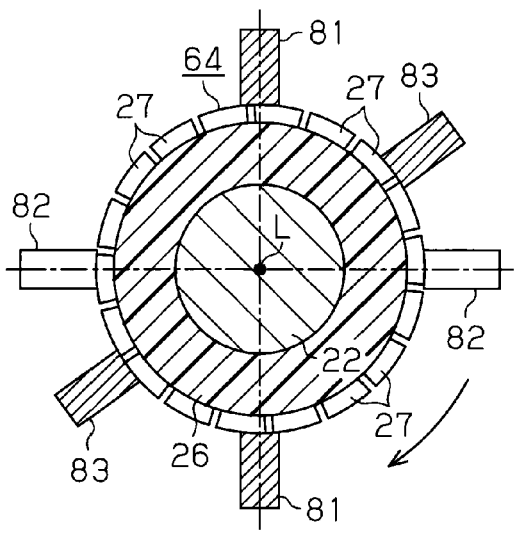
Figure 16A:
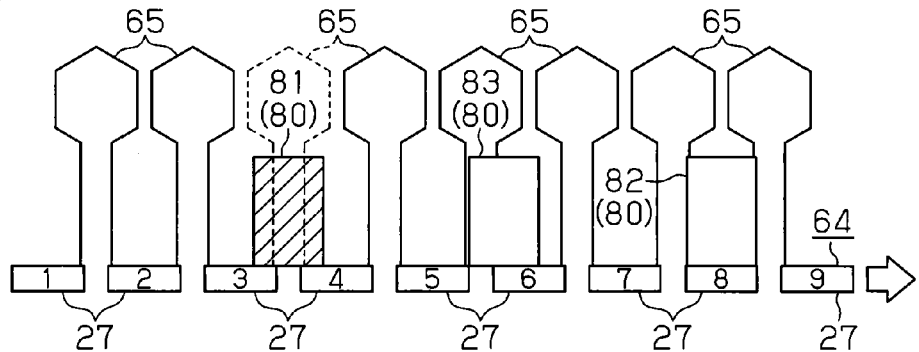
FIGS. 16(a) to 16(d) are diagrams showing the width and location of the brushes in the circumferential direction in a further example.
Figure 16B:
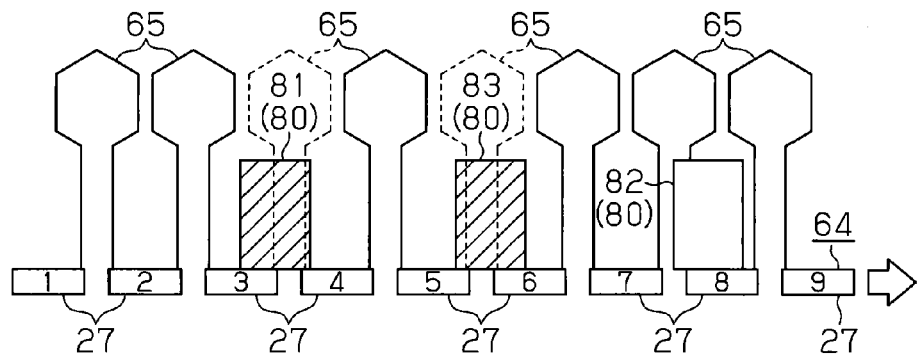
Figure 16C:
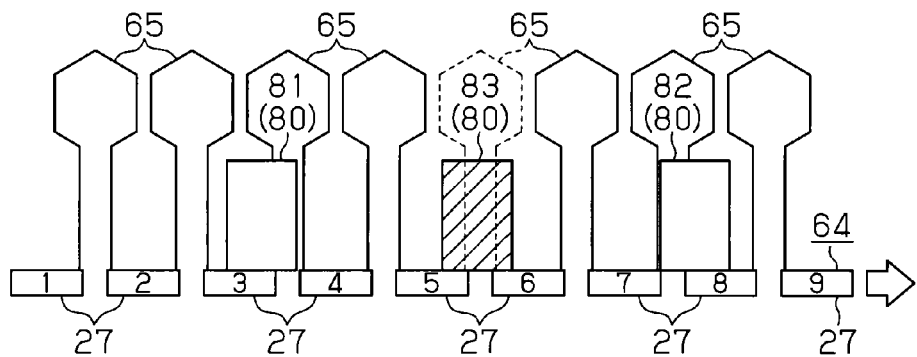
Figure 16D:
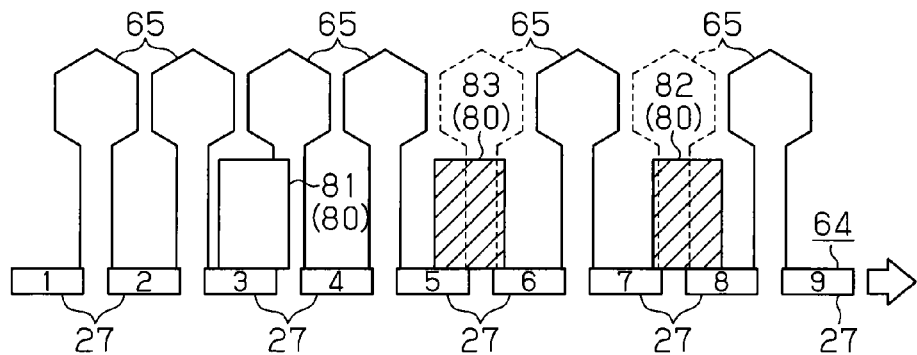
Figure 17A:
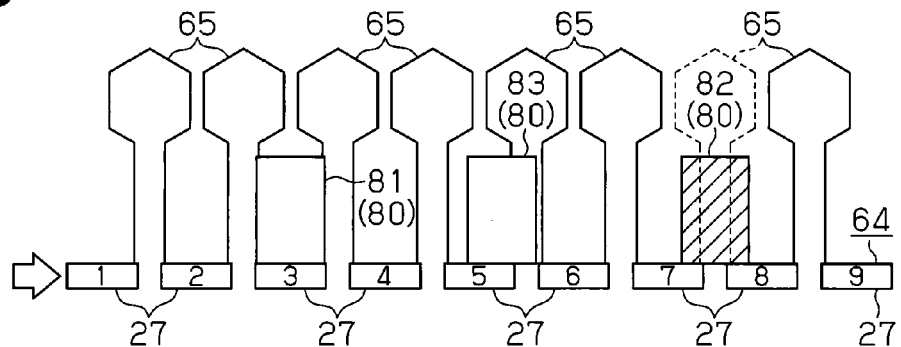
FIGS. 17(a) to 17(d) are diagrams showing the width and location of the brushes in the circumferential direction in a further example.
Figure 17B:
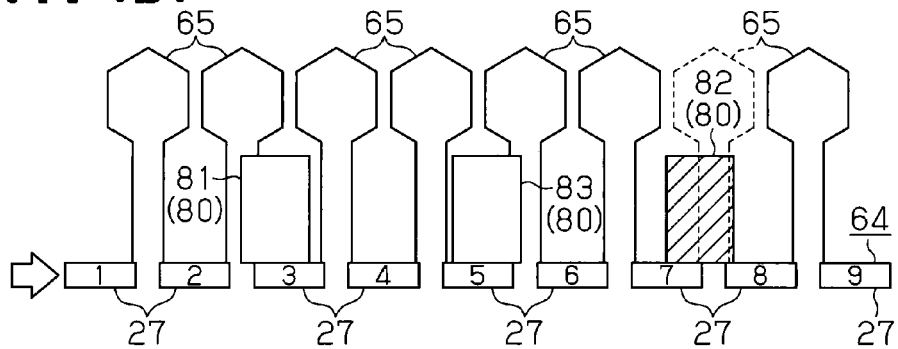
Figure 17C:
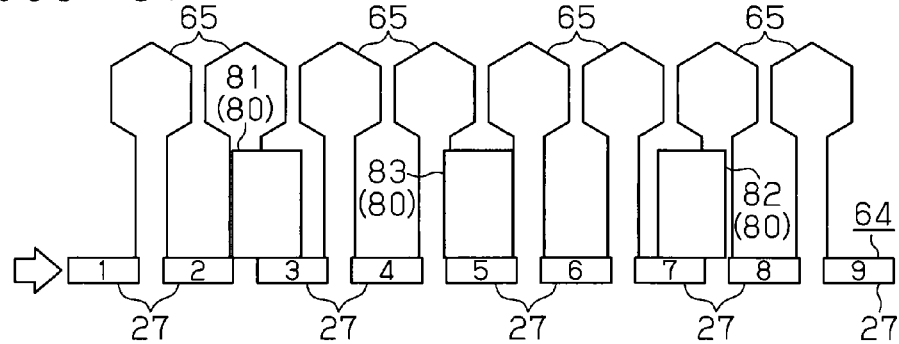
Figure 17D:
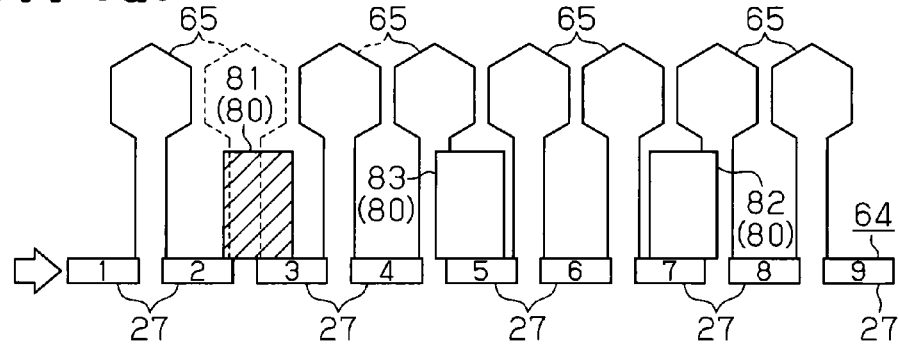
Figure 18A:
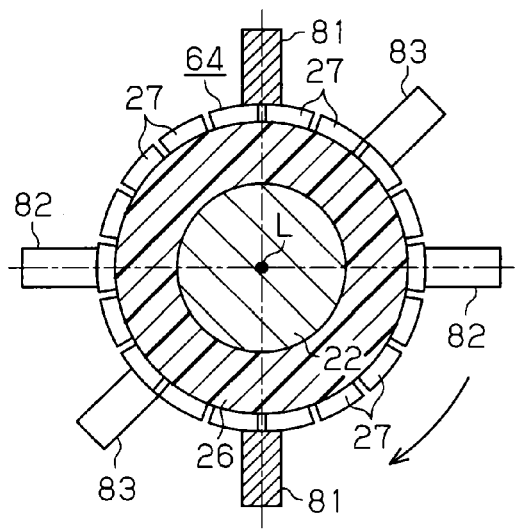
FIGS. 18(a) to 18(d) are diagrams showing the width and location of the brushes in the circumferential direction in a further example.
Figure 18B:
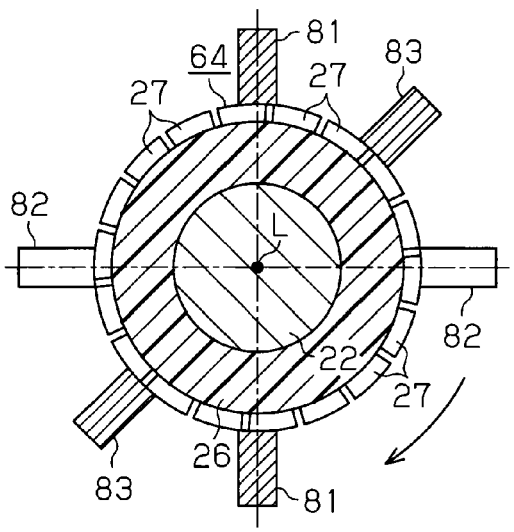
Figure 18C:
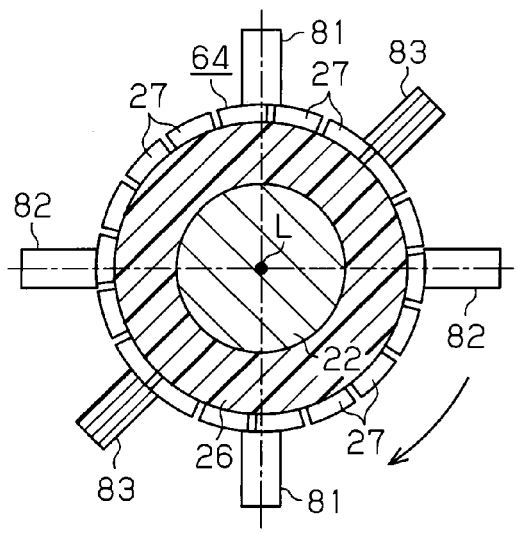
Figure 18D:
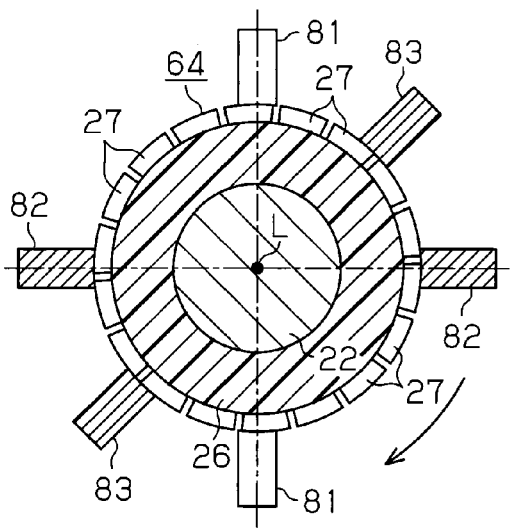
Figure 19A:
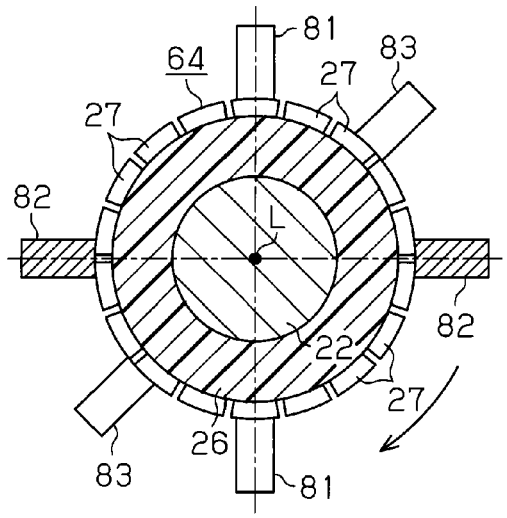
FIGS. 19(a) to 19(d) are diagrams showing the width and location of the brushes in the circumferential direction in a further example.
Figure 19B:
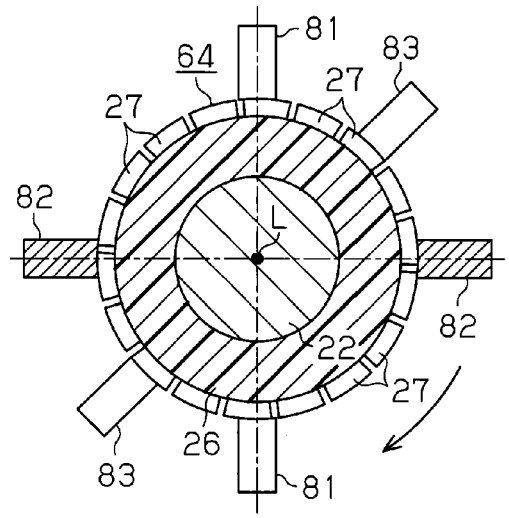
Figure 19C:
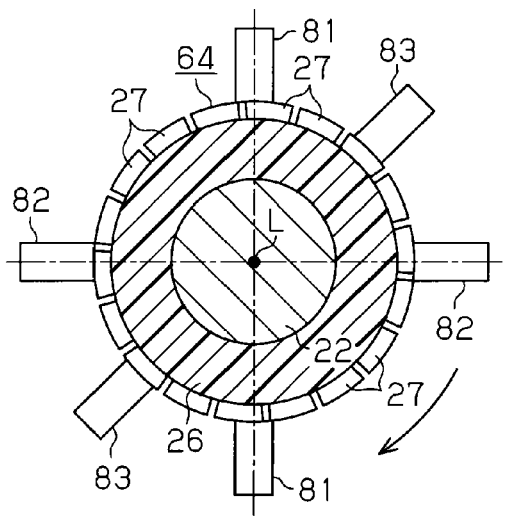
Figure 19D:
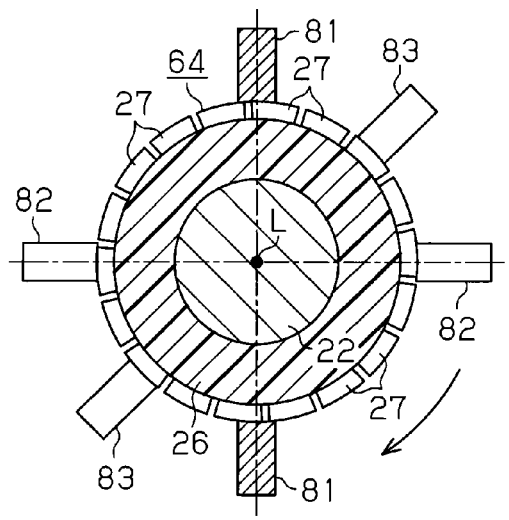

When shifting to the state shown in FIGS. 12(d) and 14(d), in addition to the high-speed drive brush 83, the common brush 81 short-circuits the number "2" and "3" segments 27, which are adjacent to each other in the circumferential direction. In this state, the low-speed drive brush 82 has one circumferential end (rear end in the rotation direction of the commutator 64) arranged between the number "7" and "8" segments 27. The low-speed drive brush 82 contacts only the number "7" segment 27 and does not contact the number "8" segment 27. In this manner, FIGS. 12(d) and 14(d) show a double type short-circuit state, in which two types of brushes, namely, the common brushes 81 and the high-speed drive brushes 83, short-circuit two segments 27 that are adjacent to each other in the circumferential direction. Thus, among the eighteen coils 65, only four coils 65 undergo commutation (refer to the coils 65 shown by broken lines in FIG. 12(d)) and the remaining fourteen coils 65 are supplied with current. In this state, there are fourteen effective coils.

When the commutator 64 further rotates and shifts to the state shown in FIGS. 11(a) and 13(a), rotation of the armature 62 repeats states similar to the states shown in FIGS. 11(a) to 11(d), FIGS. 12(a) to 12(d), FIGS. 13(a) to 13(d), and FIGS. 14(a) to 14(d). In other words, rotation of the armature 62 repeats the single type short-circuit state in which just the two common brushes 81 short-circuit two segments 27 that are adjacent to each other in the circumferential direction, the non-short-circuit state in which none of the three types of brushes 81 to 83 short-circuit two segments 27 that are adjacent to each other in the circumferential direction, the single type short-circuit state in which just the two low-speed drive brushes 82 short-circuit two segments 27 that are adjacent to each other in the circumferential direction, the double type short-circuit state in which two types of brushes, namely, the two low-speed drive brushes 82 and the two high-speed drive brushes 83, short-circuit two segments 27 that are adjacent to each other in the circumferential direction, the single type short-circuit state in which just the two high-speed drive brushes 83 short-circuit two segments 27 that are adjacent to each other in the circumferential direction, and the double type short-circuit state in which two types of brushes, namely, the two common brushes 81 and the two high-speed drive brushes 83, short-circuit two segments 27 that are adjacent to each other in the circumferential direction. Thus, all of the common brushes 81, low-speed drive brushes 82, and high-speed drive brushes 83 never simultaneously short-circuit two segments 27 that are adjacent to each other in the circumferential direction. Further, as shown in FIGS. 11 and 14, in the present embodiment, the power supply brushes 80 (brushes 81 to 83) short-circuit segments 27 adjacent to each other in the circumferential direction shift in the direction opposite to the rotation direction of the commutator 64 (toward the rear in the rotation direction).

In addition to advantages (3) and (4) of the first embodiment, the third embodiment has the advantages described below.

(1) A maximum of only two types of brushes simultaneously short-circuit two segments that are adjacent to each other in the circumferential direction. Thus, by repeating the double type short-circuit state, the single type short-circuit state, and the non-short-circuit state, change in the number of effective coils is decreased, and resistance fluctuation of the coils 65 is decreased. As a result, changes in the value of the supplied current are minimized, and torque fluctuation is minimized. Further, in a non-short-circuit state, all of the coils 65 are effective coils. Thus, the coils 65 may be used effectively.

(2) The double type short-circuit state, the single type short-circuit state, and the non-short-circuit state are repeated with the single type short-circuit state being in between the double type short-circuit states. Thus, the non-short-circuit state to the double short-circuit state and the double short-circuit state to the non-short-circuit state are reached in a stepped manner with the single type short-circuit state being in between. Accordingly, even though the double type short-circuit state is present, the number of effective coils do not suddenly change, and sudden resistance fluctuation of the coils 65 is further suppressed. As a result, sudden fluctuations in the value of the supplied current are minimized, torque fluctuation is further suppressed, and vibration of the wiper motor caused by torque fluctuation is further suppressed.

(3) The widths and locations of the common brushes 81, the low-speed drive brushes 82, and the high-speed drive brushes 83 in the circumferential direction are set based on the conditions of L2<B1<(L1+2×L2), L2<B2<(L1+2×L2), L2<B3<(L1+2×L2), and A<(n×L1+(n+1)×L2). By setting each value so as to satisfy the above conditions, a structure in that repeats short-circuit states in which a maximum of two types of brushes simultaneously short-circuit two segments that are adjacent to each other in the circumferential direction (i.e., single type short-circuit state and double type short-circuit state) and a non-short-circuit state are easily repeated.

(4) In the wiper motor of the present embodiment, as the armature 62 rotates, the power supply brushes 80 (brushes 81 to 83) short-circuit segments 27 adjacent to each other in the circumferential direction shift in the direction opposite to the rotation direction of the commutator 64 (toward the rear in the rotation direction). This generates magnetic flux in a direction opposite to the rotation direction of the armature 62. Thus, in contrast to a wiper motor in which the power supply brushes that short-circuit segments 27 adjacent in the circumferential direction shift in the same direction as the rotation direction of the commutator 64 (toward the front in the rotation direction), the wiper motor of the present embodiment functions in a direction that suppresses vibration caused by magnetic flux fluctuation.

The present invention may be embodied in the following forms.

In each of the above-described embodiments, the common brushes 41, 71, and 81, the high-speed drive brushes 43, 73, and 83, and the low-speed drive brushes 42, 72, and 82 are arranged in order from the rear to the front in the rotation direction of the commutator 64. However, the low-speed drive brushes 42, 72, and 82, the high-speed drive brushes 43, 73, and 83, and the common brushes 41, 71, and 81 may be arranged in order from the rear to the front in the rotation direction of the commutator 64.

In the first embodiment, the high-speed drive brush 43 is formed to have a smaller circumferential width than the common brush 41 and the low-speed drive brush 42. However, the circumferential widths of the common brush 41, the low-speed drive brush 42, and the high-speed drive brush 43 may be changed as required as long as the conditions of B1>L2, B2>L2, B3>L2, A<(n×L1+(n+1)×L2), D1>((n−1)×L1+(n−2)×L2), D2>((n−2)×L1+(n−3)×L2), D3>L1 are satisfied. For instance, as shown in FIG. 15(a), the circumferential widths of the common brush 41, the low-speed drive brush 42, and the high-speed drive brush 43 may be set to be the same (i.e., B1=B2=B3). In this case, as shown in FIGS. 15(a) to 15(d), the brushes 41 to 43 would also alternately short-circuit two circumferentially adjacent segments 27 in the order of the low-speed drive brush 42, the high-speed drive brush 43, and the common brush 41 as the commutator 25 rotates. Therefore, the same advantages as the above-described embodiment are obtained. In addition, a common brush may be used as the three brushes 41 to 43 since they have the same shape. This reduces the manufacturing cost.

In the third embodiment, the widths and locations of the common brushes 81, the low-speed drive brushes 82, and the high-speed drive brushes 83 in the circumferential direction may be changed as long as the conditions of L2<B1<(L1+2×L2), L2<B2<(L1+2×L2), L2<B3<(L1+2×L2), and A<(n×L1+(n+1)×L2) are satisfied.

For example, the widths and locations of the brushes 81 to 83 in the circumferential direction may be changed as shown in FIGS. 16(a) to 19(d). In such a case, rotation of the commutator 64 would sequentially repeat a single type short-circuit state in which just the common brushes 81 short-circuit adjacent segments 27 (refer to FIGS. 16(a) to 18(a)), a double type short-circuit state in which two types of brushes, namely, the two low-speed drive brushes 82 and the two high-speed drive brushes 83, short-circuit adjacent segments 27 (refer to FIGS. 16(b) and 18(b)), a single type short-circuit state in which just the high-speed drive brushes 83 short-circuit adjacent segments 27 (refer to FIGS. 16(c) and 18(c)), a double type short-circuit state in which two types of brushes, namely, the low-speed drive brushes 82 and the high-speed drive brushes 83, short-circuit adjacent segments 27 (refer to FIGS. 16(d) and 18(d)), a single type short-circuit state in which just the two low-speed drive brushes 82 short-circuit adjacent segments 27 (refer to FIGS. 17(a), 19(a), 17(b), and 19(b)), a non-short-circuit state in which none of the three types of brushes 81 to 83 short-circuit adjacent segments 27 (refer to FIGS. 17(c) and 19(c)), and a single type short-circuit state in which just the common brushes 81 short-circuit adjacent segments 27 (refer to FIGS. 17(d) to 19(d)). This obtains advantages similar to advantages (1) to (3) of the third embodiment.

Figure 20A:
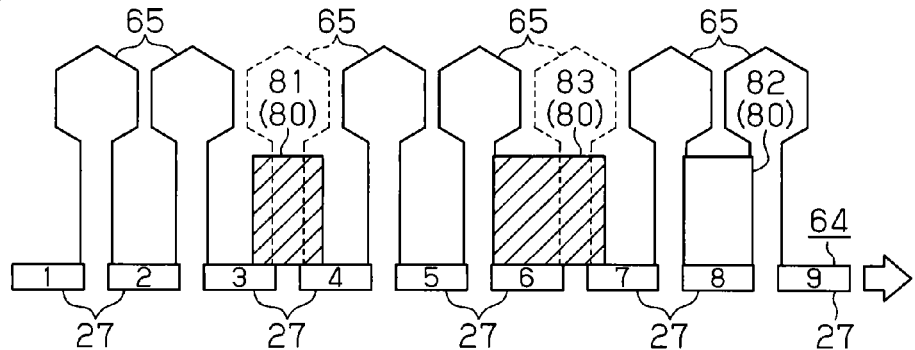
FIGS. 20(a) to 20(d) are diagrams showing the width and location of the brushes in the circumferential direction in a further example.
Figure 20B:
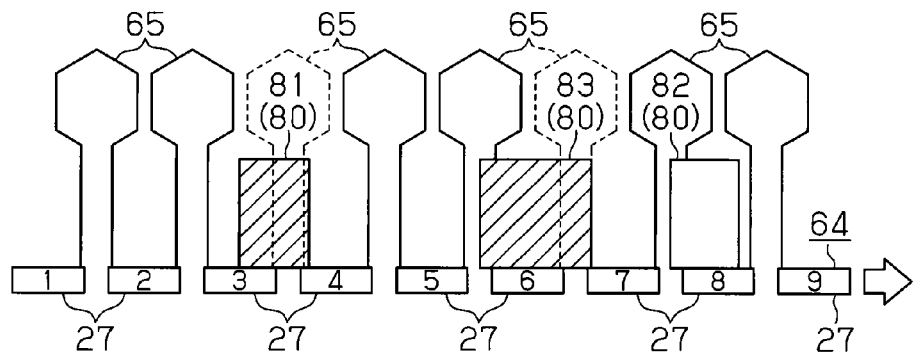
Figure 20C:
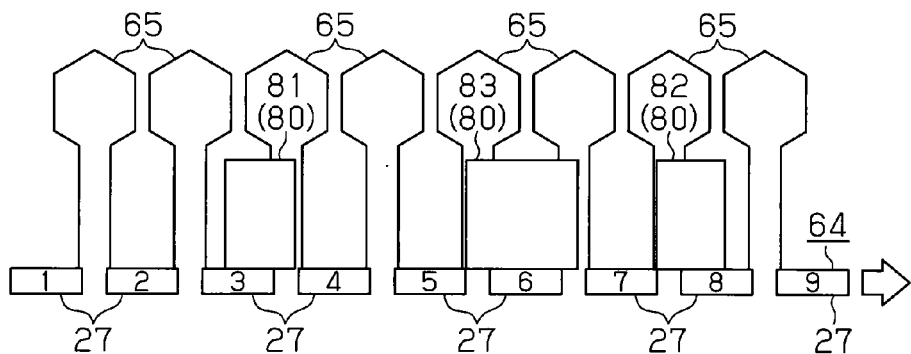
Figure 20D:
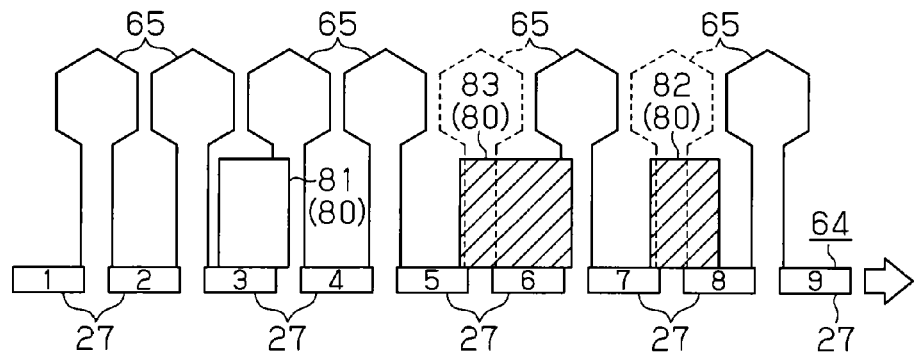
Figure 21:
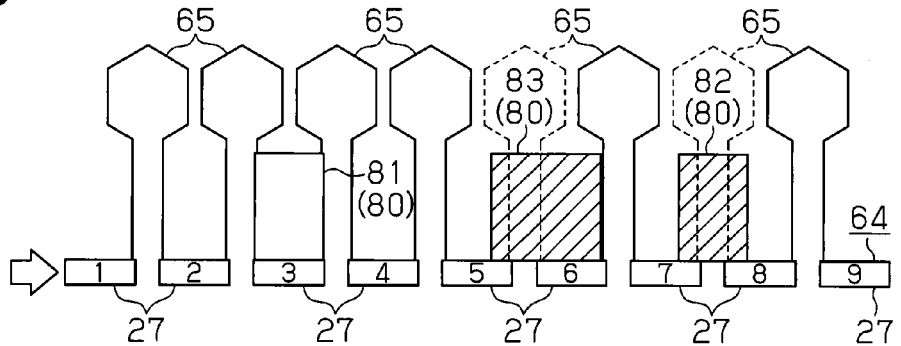
FIGS. 21(a) to 21(d) are diagrams showing the width and location of the brushes in the circumferential direction in a further example.
Figure 21:
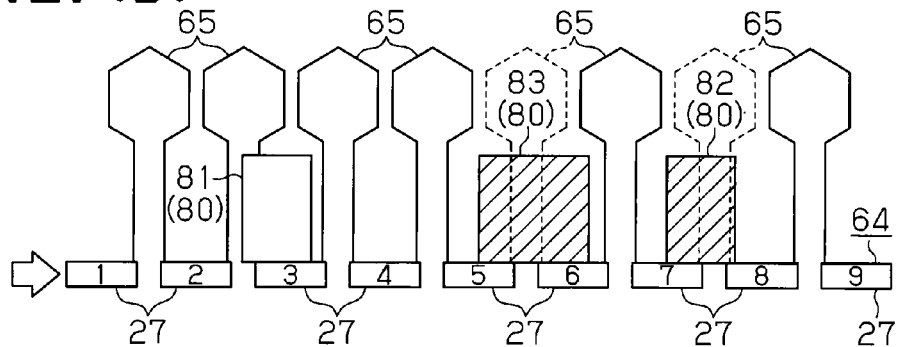
Figure 21:
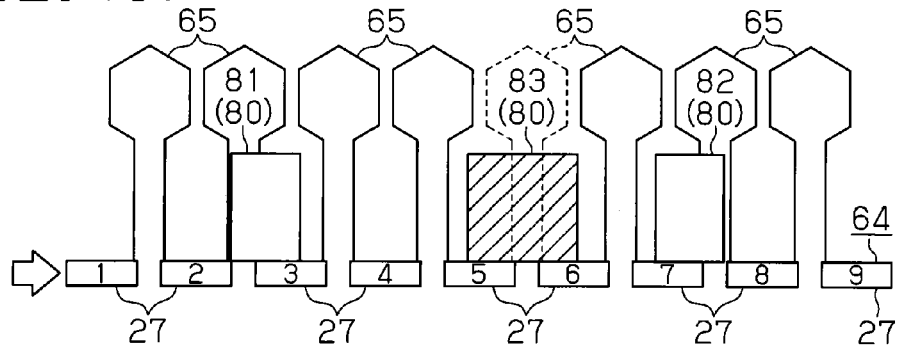
Figure 21:
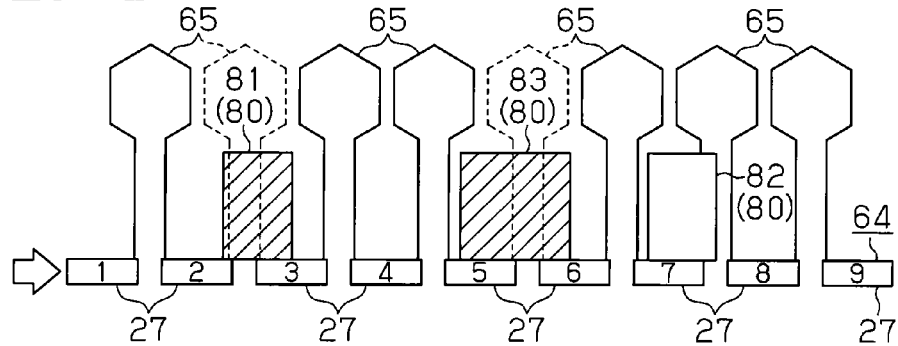
Figure 22A:
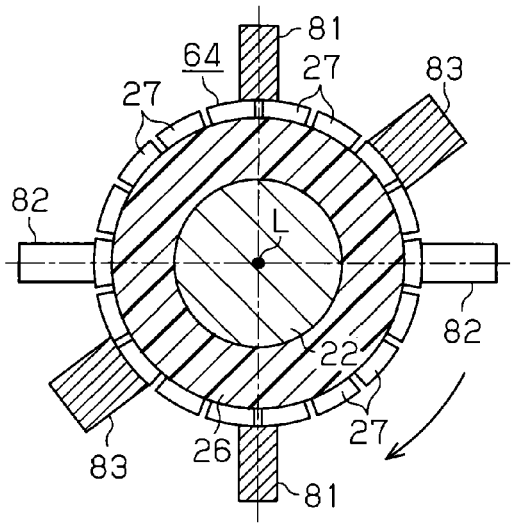
FIGS. 22(a) to 22(d) are diagrams showing the width and location of the brushes in the circumferential direction in a further example.
Figure 22B:
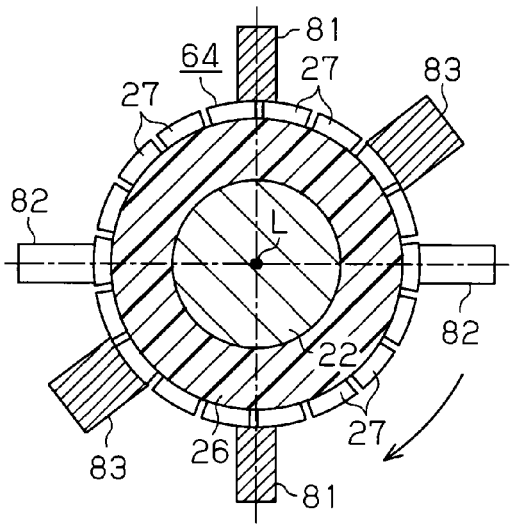
Figure 22C:
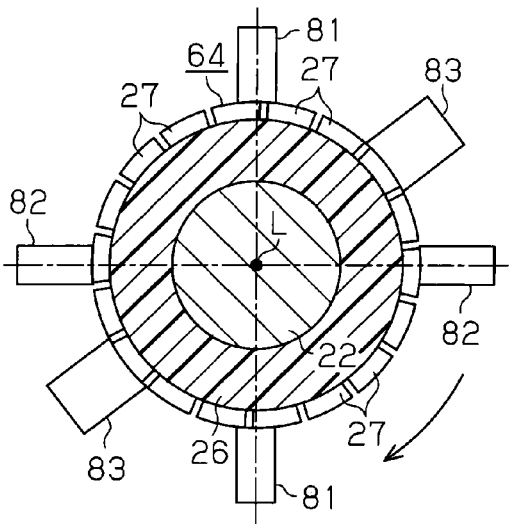
Figure 22D:
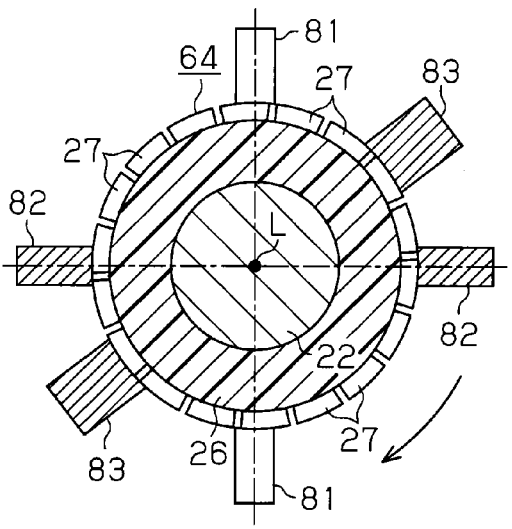
Figure 23A:
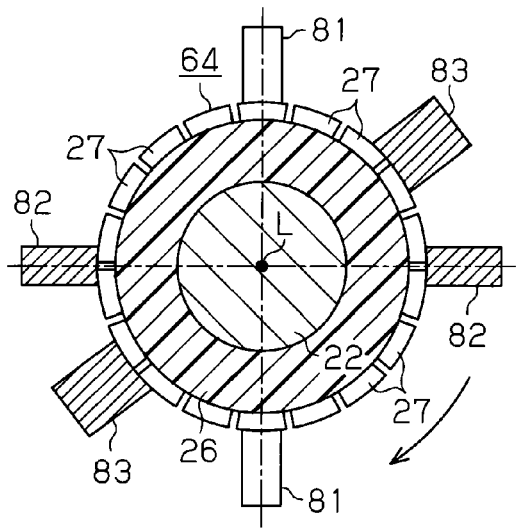
FIGS. 23(a) to 23(d) are diagrams showing the width and location of the brushes in the circumferential direction in a further example.
Figure 23B:
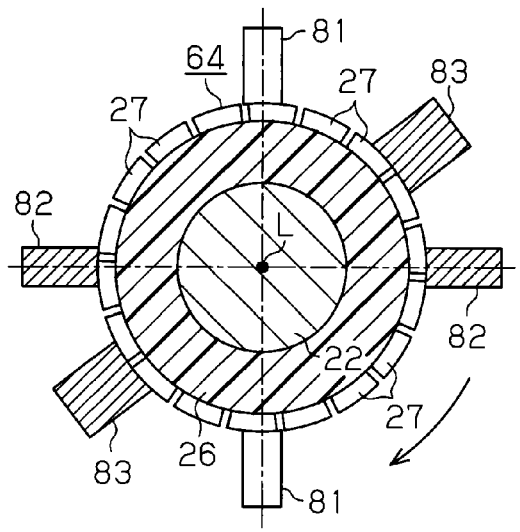
Figure 23C:
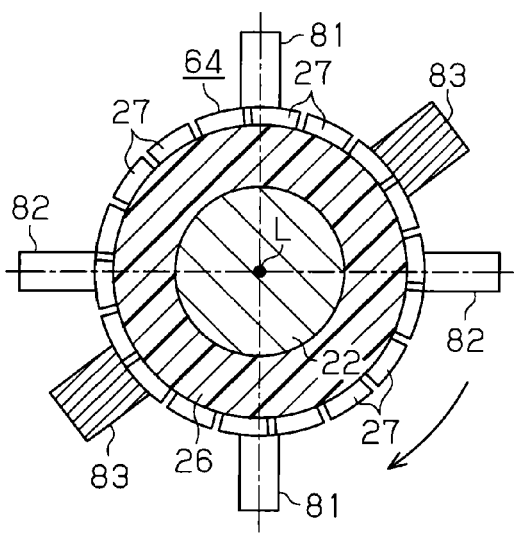
Figure 23D:
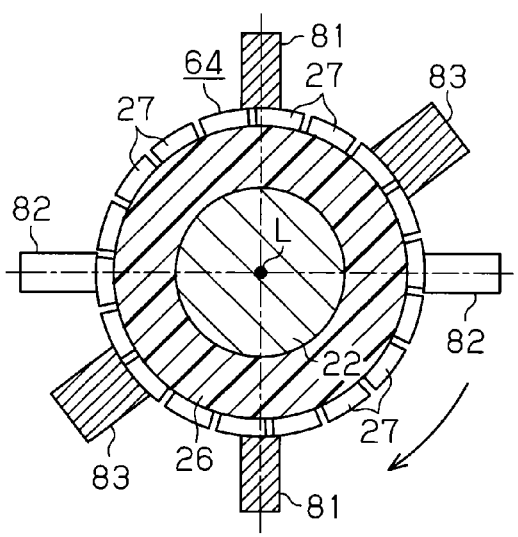
Figure 24A:
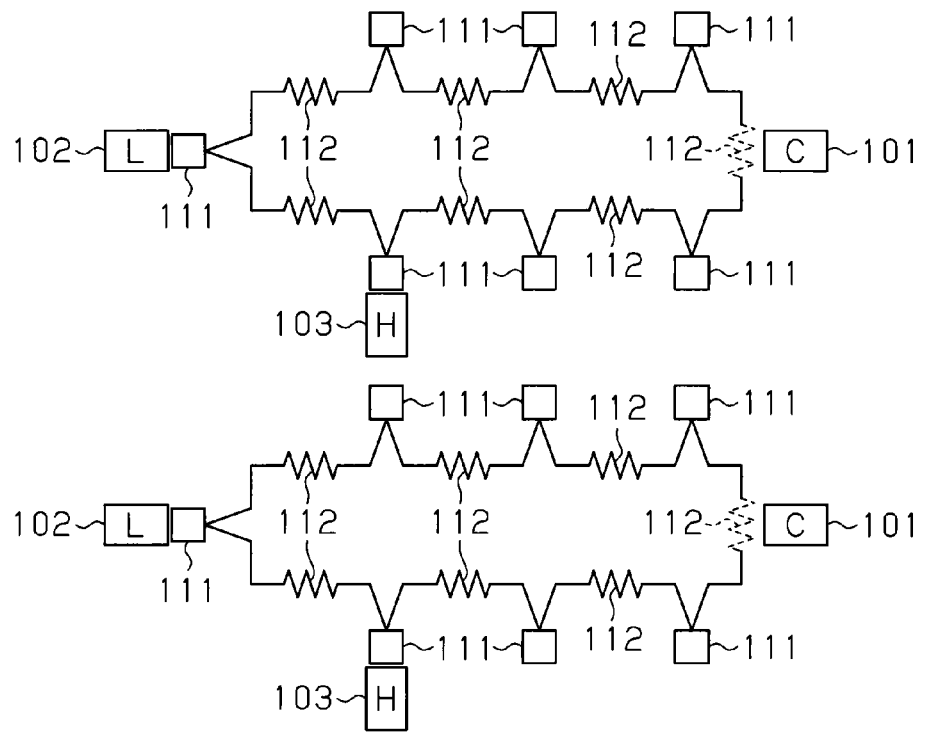
FIGS. 24(a) and 24(b) are diagrams showing changes in the number of effective coils in a motor of the prior art.
Figure 24B:
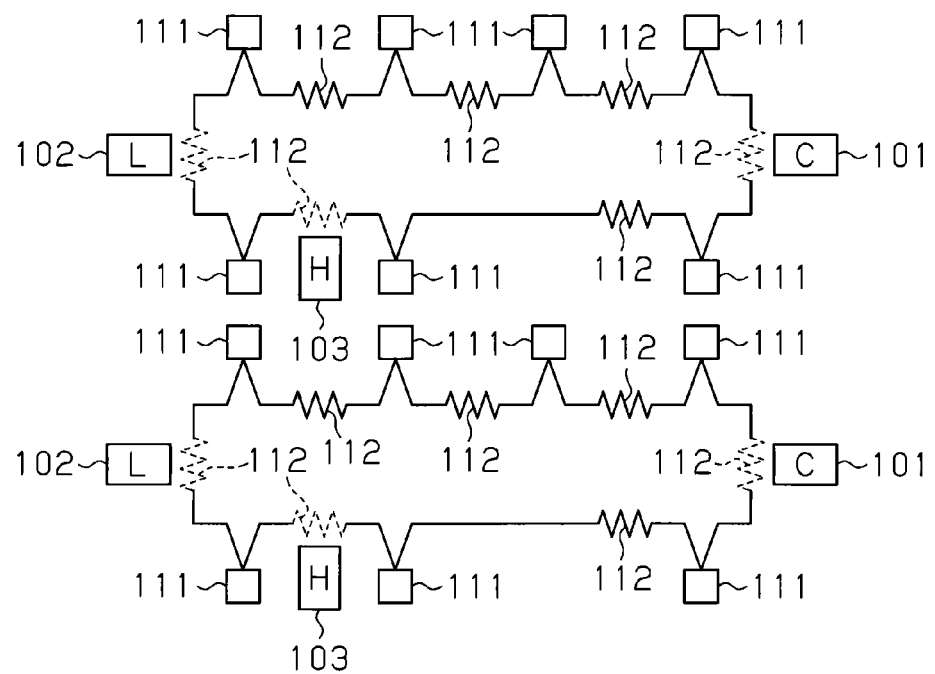

The widths and locations of the brushes 81 to 83 in the circumferential direction may be changed as shown in FIGS. 20(a) to 23(d). As shown in FIG. 20(a), in this example, the width of the high-speed drive brush 83 in the circumferential direction is set to be greater than the widths of the common brush 81 and the low-speed drive brush 82 in the circumferential direction. Further, rotation of the commutator 64 would sequentially repeat a double type short-circuit state in which two types of brushes, namely, the common brushes 81 and the two high-speed drive brushes 83, short-circuit adjacent segments 27 (refer to FIGS. 20(a), 22(a), 20(b), and 22(b)), a non-short-circuit state in which none of the three types of brushes short-circuit adjacent segments 27 (refer to FIGS. 20(c) and 22(c)), a double type short-circuit state in which two types of brushes, namely, the low-speed drive brushes 82 and the high-speed drive brushes 83, short-circuit adjacent segments 27 (refer to FIGS. 20(d), 22(d), 21(a), 23(a), 21(b), and 23(b)), a single type short-circuit state in which just the high-speed drive brushes 83 short-circuit adjacent segments 27 (refer to FIGS. 21(c) and 23(c)), and a double type short-circuit state in which two types of brushes, namely, the common brushes 81 and the high-speed drive brushes 83, short-circuit adjacent segments 27 (refer to FIGS. 21(d) and 23(d)). This obtains advantages similar to advantages (1) and (3) of the third embodiment.

In the second and third embodiments, every two segments 27 arranged in a 180° interval may be short-circuited by a short-circuit line. In this case, in the second embodiment, one set of the brushes 71 to 73 may be eliminated. In the third embodiment, one set of the brushes 81 to 83 may be eliminated.

In the first embodiment, the common brush 41 functions as a cathode brush, and the low-speed drive brush 42 and high-speed drive brush 43 function as anode brushes. Instead, the common brush 41 may function as an anode brush, and the low-speed drive brush 42 and high-speed drive brush 43 may function as cathode brushes. In this case, by reversing the structure of the magnet 12 (i.e., switching the N pole and S pole in FIG. 3), the input of current may be reversed. The same applies for the second and third embodiments.

The wiper motor (motor unit 1 and 61) is not limited to the structure of the above-described embodiments. The widths and locations of the brushes in the circumferential direction may be set so that the number P of magnetic pole portions formed by the magnet 12 is "4" or greater, the number S of the teeth 24a and 63a is the same as the number of segments 27, "2S/P" is an odd number, and the common brushes 41, 71, and 81, the low-speed drive brushes 42, 72, and 82, and the high-speed drive brushes 43, 73, and 83 do not all simultaneously short-circuit two adjacent segments 27. For example, the wiper motor may have a structure that repeats the double type short-circuit state and the non-short-circuit state. In such a case, the number of effective coils may be suppressed to suppress the generation of vibration in the wiper motor.

In each of the above-described embodiments, the present invention is applied to a wiper motor, which is used as a drive source for a vehicle wiper. However, the present invention may be applied to a motor that is not a wiper motor. The present invention may be embodied in a motor that does not include the reduction gear mechanism 53.

The magnet 12 may be formed from a magnet 12 that forms four or more magnetic pole portions or includes a plurality of magnets 12, with each forming a magnetic pole.

When the number of magnetic pole portions is P, three types of brushes, in which a common brush, low-speed drive brush, and high-speed drive brush form a single set, are located at positions corresponding to magnetic pole portions and arranged in angular intervals (720/P)°.

Further, the short-circuit line that reduces the number of brushes may connect P/2 segments at a (720/P)° interval. In such a case, the number of brushes is adjustable within a range of three brushes or more (3P/2). For example, when the number of magnetic pole portions is six, short-circuit lines connect three segments at a 120° interval, and the brushes are adjustable within a range of three to nine. When the number of magnetic pole portions is eight, short-circuit lines connect four segments at a 90° interval, and the brushes are adjustable within a range of three to twelve.

What is claimed is:

1. A motor comprising:
   at least one magnet forming four or more magnetic pole portions;
   an armature including a rotation shaft, an armature core fixed to the rotation shaft and having a plurality of teeth, a coil wound around the teeth, and a commutator fixed to the rotation shaft and having a plurality of segments arranged in a circumferential direction of the rotation shaft; and
   a common brush, a low-speed drive brush, and a high-speed drive brush spaced apart and arranged along the circumferential direction of the rotation shaft to slidably contact the commutator, with each brush having a width in the circumferential direction of the rotation shaft;
   wherein the number of the teeth is the same as the number of segments;
   when the number of the magnetic pole portions formed by the magnet is represented by P and the number of the teeth is represented by S, (2S/P) is an odd number;
   the width and location of each brush in the circumferential direction of the rotation shaft are set so that the three types of the brushes, which are the common brush, the low-speed drive brush, and the high-speed drive brush, all do not simultaneously short-circuit two of the segments that are adjacent to each other in the circumferential direction; and
   each of the three types of the brushes has a timing at which the brush starts to short-circuit the two of the segments, and the timings of the three types of the brushes differ from each other.

2. The motor according to claim 1, wherein the width of each brush and the location of the brush in the circumferential direction of the rotation shaft are set so that the common brush, the low-speed drive brush, and the high-speed drive brush sequentially short-circuit two of the segments that are adjacent to each other in the circumferential direction.

3. The motor according to claim 1, wherein rotation of the armature repeats a short-circuit state, in which a maximum of two of the three types of the brushes, which are the common brush, the low-speed drive brush, and the high-speed drive brush, short circuit two of the segments that are adjacent to each other in the circumferential direction, and a non-short-circuit state, in which none of the three types of the brushes short circuit two of the segments that are adjacent to each other in the circumferential direction.

4. The motor according to claim 3, wherein rotation of the armature repeats a double type short-circuit state, in which two of the three types of the brushes, which are the common brush, the low-speed drive brush, and the high-speed drive brush, short circuit two of the segments that are adjacent to each other in the circumferential direction, a single-type short circuit state, in which one type of the brushes short circuit two of the segments that are adjacent to each other in the circumferential direction, and the non-short-circuit state so that the single-type short circuit state is performed before and after the double type short-circuit state.

5. The motor according to claim 3, wherein with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, and the width of a layout area in which the three brushes are arranged is represented by A;

$$L2 < B1 < (L1 + 2 \times L2),$$

$$L2 < B2 < (L1 + 2 \times L2),$$

$$L2 < B3 < (L1 + 2 \times L2), \text{ and}$$

$$A < (n \times L1 + (n+1) \times L2)$$

are satisfied (where the number of the segments is divided by the number P of magnetic pole portions of the magnet to obtain a quotient, and the quotient is rounded up to an integer to obtain n).

6. The motor according to claim 3, wherein rotation of the armature repeats a single type short-circuit state, in which one of the three types of the brushes, which are the common brush, the low-speed drive brush, and the high-speed drive brush, short circuit two of the segments that are adjacent to each other in the circumferential direction, and the non-short-circuit state.

7. The motor according to claim 6, wherein with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, the width of a layout area in which the three brushes are arranged is represented by A, the common brush and the low-speed drive brush located at opposite sides of the high-speed drive brush are spaced apart by an interval represented by D1, the common brush and the high-speed drive brush are spaced apart by an interval represented by D2, and the high-speed drive brush and the low-speed drive brush are spaced apart by an interval represented by D3;

$B1 > L2, B2 > L2, B3 > L2,$ $A < (n \times L1 + (n+1) \times L2),$ $D1 > ((n-1) \times L1 + (n-2) \times L2),$ $D2 > (n1 \times L1 + (n1-1) \times L2),$ $D3 > (n2 \times L1 + (n2-1) \times L2),$ $n = n1 + n2 + 1$ are satisfied (where the number of the segments is divided by the number P of magnetic pole portions of the magnet to obtain a quotient, and the quotient is rounded up to an integer to obtain n, with n1 and n2 being positive integers).

8. The motor according to claim 6, wherein with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, the width of a layout area in which the three brushes are arranged is represented by A, the common brush and the low-speed drive brush located at opposite sides of the high-speed drive brush are spaced apart by an interval represented by D1, the common brush and the high-speed drive brush are spaced apart by an interval represented by D2, and the high-speed drive brush and the low-speed drive brush are spaced apart by an interval represented by D3;

$B1 > L2, B2 > L2, B3 > L2,$ $A < (n \times L1 + (n+1) \times L2),$ $D1 > ((n-1) \times L1 + (n-2) \times L2),$ $D2 > ((n-2) \times L1 + (n-3) \times L2),$ and $D3 > L1$ are satisfied (where n is a value that is the same as the number of segments arranged in a range of (360°/P)).

9. The motor according to claim 1, wherein the common brush, the low-speed drive brush, and the high-speed drive brush are arranged in the order of the common brush, the high-speed drive brush, and the low-speed drive brush from a rear side to a front side with respect to a rotation direction of the commutator.

10. The motor according to claim 1, wherein a slot, through which the coil extends, is formed between adjacent ones of the teeth in the circumferential direction of the rotation shaft, and a value obtained by dividing the total number of slots by two is an odd number.

11. A brush configuration method for setting a width and a location for a plurality of brushes in a motor, the motor including at least one magnet, which forms four or more magnetic pole portions, and an armature, the armature including a rotation shaft, an armature core fixed to the rotation shaft and having a plurality of teeth, a coil wound around the teeth, and a commutator fixed to the rotation shaft and having a plurality of segments arranged in a circumferential direction of the rotation shaft, with a common brush, a low-speed drive brush, and a high-speed drive brush spaced apart and arranged along the circumferential direction of the rotation shaft in slidably contact with the commutator, and each brush having a width in the circumferential direction of the rotation shaft, the method comprising:

setting the number of the teeth to be the same as the number of the segments;

setting the number of the magnetic pole portions formed by the magnet and represented by P and the number of the teeth represented by S so that (2S/P) is an odd number; and setting the width of each brush and location of the brush in the circumferential direction of the rotation shaft so that the three types of the common brush, which are the low-speed drive brush, and the high-speed drive brush, all do not simultaneously short-circuit two of the segments that are adjacent to each other in the circumferential direction; and each of the three types of the brushes has a timing at which the brush starts to short-circuit the two of the segments, and the timings of the three types of the brushes differ from each other.

12. The brush configuration method according to claim 11, wherein the width of each brush and location of the brush in the circumferential direction of the rotation shaft are set so that the common brush, the low-speed drive brush, and the high-speed drive brush sequentially short-circuit two of the segments that are adjacent to each other in the circumferential direction.

13. The brush configuration method according to claim 11, wherein the width of each brush and location of the brush in the circumferential direction of the rotation shaft are set so that rotation of the armature repeats a short-circuit state, in which a maximum of two of the three types of the brushes, which are the common brush, the low-speed drive brush, and the high-speed drive brush, short circuit two of the segments that are adjacent to each other in the circumferential direction, and a non-short-circuit state in which none of the three types of the brushes short circuit two of the segments that are adjacent to each other in the circumferential direction.

14. The brush configuration method according to claim 13, wherein the width of each brush and location of the brush in the circumferential direction of the rotation shaft are set so that rotation of the armature repeats a double type short-circuit state, in which two of the three types of the brushes, which are the common brush, the low-speed drive brush, and the high-speed drive brush, short circuit two of the segments that are adjacent to each other in the circumferential direction, a single-type short circuit state, in which one type of the brushes short circuit two of the segments that are adjacent to each other in the circumferential direction, and the non-short-circuit state so that the single-type short circuit state is performed before and after the double type short-circuit state.

15. The brush configuration method according to claim 13, wherein with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, and the width of a layout area in which the three brushes are arranged is represented by A, each value is set to satisfy;

$L2 < B1 < (L1 + 2 \times L2)$, $L2 < B2 < (L1 + 2 \times L2)$, $L2 < B3 < (L1 + 2 \times L2)$, and $A < (n \times L1 + (n+1) \times L2)$ (where the number of the segments is divided by the number P of magnetic pole portions of the magnet to obtain a quotient, and the quotient is rounded up to an integer to obtain n).

16. The brush configuration method according to claim 13, wherein the width of each brush and location of the brush in the circumferential direction of the rotation shaft are set so that rotation of the armature repeats a single type short-circuit state, in which one of the three types of the brushes, which are the common brush, the low-speed drive brush, and the high-speed drive brush, short circuit two of the segments that are adjacent to each other in the circumferential direction, and the non-short-circuit state.

17. The brush configuration method according to claim 16, wherein with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, the width of a layout area in which the three brushes are arranged is represented by A, the common brush and the low-speed drive brush located at opposite sides of the high-speed drive brush are spaced apart by an interval represented by D1, the common brush and the high-speed drive brush are spaced apart by an interval represented by D2, and the high-speed drive brush and the low-speed drive brush are spaced apart by an interval represented by D3, each value is set to satisfy;

$B1 > L2, B2 > L2, B3 > L2$, $A < (n \times L1 + (n+1) \times L2)$, $D1 > ((n-1) \times L1 + (n-2) \times L2)$, $D2 > (n1 \times L1 + (n1-1) \times L2)$, $D3 > (n2 \times L1 + (n2-1) \times L2)$, $n = n1 + n2 + 1$ (where the number of the segments is divided by the number P of magnetic pole portions of the magnet to obtain a quotient, and the quotient is rounded up to an integer to obtain n, with n1 and n2 being positive integers).

18. The brush configuration method according to claim 16, wherein with respect to the circumferential direction of the rotation shaft, when the segments each have a width represented by L1, adjacent ones of the segments are spaced apart by an interval represented by L2, the width of the common brush is represented by B1, the width of the low-speed drive brush is represented by B2, the width of the high-speed drive brush is represented by B3, the width of a layout area in which the three brushes are arranged is represented by A, the common brush and the low-speed drive brush located at opposite sides of the high-speed drive brush are spaced apart by an interval represented by D1, the common brush and the high-speed drive brush are spaced apart by an interval represented by D2, and the high-speed drive brush and the low-speed drive brush are spaced apart by an interval represented by D3, each value is set to satisfy;

$B1 > L2, B2 > L2, B3 > L2$, $A < (n \times L1 + (n+1) \times L2)$, $D1 > ((n-1) \times L1 + (n-2) \times L2)$, $D2 > ((n-2) \times L1 + (n-3) \times L2)$, and $D3 > L1$ (where n is a value that is the same as the number of segments arranged in a range of $(360°/P)$).

19. The brush configuration method according to claim 11, wherein the common brush, the low-speed drive brush, and the high-speed drive brush are arranged in the order of the common brush, the high-speed drive brush, and the low-speed drive brush from a rear side to a front side with respect to a rotation direction of the commutator.

20. The brush configuration method according to claim 11, wherein a slot, through which the coil extends, is formed between adjacent ones of the teeth in the circumferential direction of the rotation shaft, and the number of the teeth is set such that a value obtained by dividing the total number of slots by two is an odd number.

* * * * *